US012583968B2

(12) United States Patent
Takashita et al.

(10) Patent No.: US 12,583,968 B2
(45) Date of Patent: Mar. 24, 2026

(54) FLUORINE-CONTAINING ETHER COMPOUND AND PRODUCTION METHOD THEREFOR, COMPOUND AND PRODUCTION METHOD THEREFOR, FLUORINE-CONTAINING ETHER COMPOSITION, COATING LIQUID, AND ARTICLE AND PRODUCTION METHOD THEREFOR

(71) Applicant: AGC Inc., Tokyo (JP)

(72) Inventors: Ryuta Takashita, Chiyoda-ku (JP); Koki Watanabe, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 710 days.

(21) Appl. No.: 17/929,769

(22) Filed: Sep. 6, 2022

(65) Prior Publication Data

US 2023/0024292 A1 Jan. 26, 2023

Related U.S. Application Data

(63) Continuation of application No. PCT/JP2021/007810, filed on Mar. 2, 2021.

(30) Foreign Application Priority Data

Mar. 9, 2020 (JP) ................................ 2020-039975

(51) Int. Cl.

*C08G 65/336* (2006.01)
*C09D 5/00* (2006.01)
*C09D 7/63* (2018.01)
*C09D 171/00* (2006.01)

(52) U.S. Cl.

CPC ............. *C08G 65/336* (2013.01); *C09D 5/00* (2013.01); *C09D 7/63* (2018.01); *C09D 171/00* (2013.01)

(58) Field of Classification Search

None

See application file for complete search history.

(56) References Cited

U.S. PATENT DOCUMENTS

| | | | |
|---|---|---|---|
| 6,127,498 | A | 10/2000 | Tonelli et al. |
| 6,183,872 | B1 | 2/2001 | Tanaka et al. |
| 6,200,684 | B1 | 3/2001 | Yamaguchi et al. |
| 2010/0129672 | A1 | 5/2010 | Hao et al. |
| 2012/0077041 | A1 | 3/2012 | Yamane et al. |
| 2014/0287240 | A1 | 9/2014 | Murotani et al. |
| 2014/0287246 | A1 | 9/2014 | Murotani et al. |
| 2014/0302332 | A1 | 10/2014 | Murotani et al. |
| 2015/0274888 | A1 | 10/2015 | Sakoh |
| 2015/0274889 | A1 | 10/2015 | Sakoh et al. |
| 2015/0307719 | A1 | 10/2015 | Mitsuhashi et al. |
| 2015/0315443 | A1 | 11/2015 | Takeda et al. |
| 2016/0009929 | A1 | 1/2016 | Hoshino et al. |
| 2016/0264788 | A1 | 9/2016 | Hoshino et al. |
| 2016/0304665 | A1 | 10/2016 | Sakoh et al. |
| 2016/0319071 | A1 | 11/2016 | Sakoh et al. |
| 2016/0355638 | A1 | 12/2016 | Sakoh et al. |
| 2018/0142062 | A1 | 5/2018 | Hoshino et al. |
| 2018/0148606 | A1 | 5/2018 | Hoshino et al. |
| 2019/0002635 | A1 | 1/2019 | Mitsuhashi et al. |
| 2019/0040266 | A1 | 2/2019 | Hoshino et al. |
| 2020/0002551 | A1 | 1/2020 | Mitsuhashi et al. |
| 2020/0056067 | A1 | 2/2020 | Mitsuhashi et al. |
| 2020/0071251 | A1 | 3/2020 | Hoshino et al. |
| 2020/0157376 | A1 | 5/2020 | Hoshino et al. |
| 2020/0165273 | A1 | 5/2020 | Hoshino et al. |
| 2020/0165384 | A1 | 5/2020 | Hoshino et al. |
| 2020/0165385 | A1 | 5/2020 | Uno et al. |
| 2020/0231747 | A1 | 7/2020 | Furukawa et al. |
| 2021/0269591 | A1* | 9/2021 | Matsuura ............. C08G 65/336 |

FOREIGN PATENT DOCUMENTS

| | | | | |
|---|---|---|---|---|
| CN | 114276741 | A * | 4/2022 | ........... C09D 5/1656 |
| CN | 114276741 | B * | 10/2024 | ........... C08G 65/336 |
| EP | 0 933 377 | A2 | 8/1999 | |
| JP | 11-029585 | A | 2/1999 | |
| JP | 2874715 | B2 | 3/1999 | |
| JP | 2000-144097 | A | 5/2000 | |
| JP | 2000-327772 | A | 11/2000 | |
| JP | 2002-506887 | A | 3/2002 | |
| JP | 2008-534696 | A | 8/2008 | |
| JP | 4138936 | B2 | 8/2008 | |
| JP | 2012-072272 | A | 4/2012 | |
| JP | 2014-070163 | A | 4/2014 | |
| JP | 2014-080473 | A | 5/2014 | |
| JP | 2014-218639 | A | 11/2014 | |
| JP | 2015-196723 | A | 11/2015 | |
| JP | 2015-199906 | A | 11/2015 | |
| JP | 2016-204656 | A | 12/2016 | |
| JP | 2016-210854 | A | 12/2016 | |
| JP | 2016-222859 | A | 12/2016 | |
| JP | 2019-044158 | A | 3/2019 | |
| WO | WO 99/037720 | A1 | 7/1999 | |
| WO | WO 2006/107083 | A2 | 10/2006 | |
| WO | WO 2011/059430 | A1 | 5/2011 | |
| WO | WO 2011/060047 | A1 | 5/2011 | |
| WO | WO 2012/064649 | A1 | 5/2012 | |
| WO | WO 2013/042732 | A1 | 3/2013 | |
| WO | WO 2013/121984 | A1 | 8/2013 | |
| WO | WO 2013/121985 | A1 | 8/2013 | |
| WO | WO 2013/121986 | A1 | 8/2013 | |
| WO | WO 2014/126064 | A1 | 8/2014 | |
| WO | WO 2014/163004 | A1 | 10/2014 | |
| WO | WO 2015/087902 | A1 | 6/2015 | |

(Continued)

*Primary Examiner* — Katarzyna I Kolb

(74) *Attorney, Agent, or Firm* — Oblon, McClelland, Maier & Neustadt, L.L.P.

(57) ABSTRACT

Provided are: a fluorine-containing ether compound, a fluorine-containing ether composition, and a coating liquid that are capable of forming a surface layer having excellent durability; and an article that has a surface layer having excellent durability. The present invention provides a fluorine-containing ether compound represented by formula (A1) or formula (A2) below.

$$R^fO—(R^{f1}O)_m—R^1\text{-}L^1\text{-}R^2\text{-}Q^1(\text{-}T)_n \quad \text{formula (A1)}$$

$$(T\text{-})_nQ^1\text{-}R^2\text{-}L^1\text{-}R^1—O—(R^{f1}O)_m—R^1\text{-}L^1\text{-}R^2\text{-}Q^1(\text{-}T)_n \quad \text{formula (A2)}$$

In the formulae, symbols are as defined in the description.

19 Claims, No Drawings

(56) References Cited

FOREIGN PATENT DOCUMENTS

| | | | | | |
|---|---|---|---|---|---|
| WO | WO 2017/022437 | A1 | | 2/2017 | |
| WO | WO 2017/038830 | A1 | | 3/2017 | |
| WO | WO 2017/038832 | A1 | | 3/2017 | |
| WO | WO 2017/187775 | A1 | | 11/2017 | |
| WO | WO 2018/079743 | A1 | | 5/2018 | |
| WO | WO 2018/143433 | A1 | | 8/2018 | |
| WO | WO 2018/216630 | A1 | | 11/2018 | |
| WO | WO 2019/039186 | A1 | | 2/2019 | |
| WO | WO 2019/039226 | A1 | | 2/2019 | |
| WO | WO 2019/039341 | A1 | | 2/2019 | |
| WO | WO 2019/044479 | A1 | | 3/2019 | |
| WO | WO 2019/163282 | A1 | | 8/2019 | |
| WO | WO-2020111009 | A1 | * | 6/2020 | ........... C09D 201/04 |
| WO | WO-2020111010 | A1 | * | 6/2020 | ........... C09D 201/10 |

* cited by examiner

FLUORINE-CONTAINING ETHER COMPOUND AND PRODUCTION METHOD THEREFOR, COMPOUND AND PRODUCTION METHOD THEREFOR, FLUORINE-CONTAINING ETHER COMPOSITION, COATING LIQUID, AND ARTICLE AND PRODUCTION METHOD THEREFOR

INCORPORATION BY REFERENCE

This application is based upon and claims the benefit of priority from Japanese Patent Application 2020-039975 filed on Mar. 9, 2020, and PCT application No. PCT/JP2021/007810 filed on Mar. 2, 2021, the disclosure of which is incorporated herein in its entirety by reference.

BACKGROUND

The present invention relates to a fluorine-containing ether compound and a production method therefor, a novel compound suited for producing such a fluorine-containing ether compound and the like and a production method therefor, a fluorine-containing ether composition, a coating liquid, and an article and a production method therefor.

Fluorine-containing ether compounds having perfluoropolyether chains and hydrolyzable silyl groups are suitably used as surface treatment agents because they can form surface layers on the surface of substrates that exhibit high lubricity, water and oil repellency, and other properties. The surface treatment agents containing fluorine-containing ether compounds are used for applications where the performance by which the water and oil repellency of the surface layer is not easily degraded by repeated finger rubbing (rub resistance) and the performance by which fingerprints attached to the surface layer can be readily removed by wiping (fingerprint stain removability) are required to be maintained for a long period of time, for example, as surface treatment agents for members that constitute the surface touched by fingers of touch panels, eyeglass lenses, and displays of wearable terminals.

As fluorine-containing ether compounds that are capable of forming surface layers having excellent rub resistance and fingerprint stain removability on the surface of substrates, fluorine-containing ether compounds having perfluoropolyether chains and hydrolyzable silyl groups have been proposed (Japanese Unexamined Patent Application Publication No. 2015-196723 and No. 2016-204656).

SUMMARY

The above surface treatment agents are demanded to be applicable not only to display surfaces of smartphones and tablet devices, for example, but also to the surface treatment of various materials. There is a need to even further improve the durability of surface treatment agents.

An object of the present invention is to provide: a fluorine-containing ether compound, a fluorine-containing ether composition, and a coating liquid that are capable of forming a surface layer having excellent durability; and an article that has a surface layer having excellent durability.

The present invention provides a fluorine-containing ether compound and a production method therefor, a compound and a production method therefor, a fluorine-containing composition, a coating liquid, and an article and a production method therefor that have the following configurations [1] to [15]:

[1] A fluorine-containing ether compound represented by formula (A1) or formula (A2) below:

$$R^fO—(R^{f1}O)_m—R^1\text{-}L^1\text{-}R^2\text{-}Q^1(\text{-}T)_n \qquad \text{formula (A1)}$$

$$(T\text{-})_nQ^1\text{-}R^2\text{-}L^1\text{-}R^1—O—(R^{f1}O)_m—R^1\text{-}L^1\text{-}R^2\text{-}Q^1(\text{-}T)_n \qquad \text{formula (A2)}$$

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^1$ is a (1+n)-valent linking group, and a plurality of $Q^1$, when present, may be the same as or different from each other;

T is an adhesion group, and a plurality of T may be the same as or different from each other;

m is an integer of 0 to 210; and n is an integer of 2 to 20, and a plurality of n, when present, may be the same as or different from each other.

[2] The fluorine-containing ether compound according to [1], in which $R^1$ has 1 to 6 carbon atoms.

[3] The fluorine-containing ether compound according to [1] or [2], in which $R^2$ has 1 to 10 carbon atoms.

[4] The fluorine-containing ether compound according to any of [1] to [3], in which $\text{-}Q^1(\text{-}T)_n$ is $\text{-}Q^2[(\text{-}R^3\text{-}T)_a(\text{-}R^4)_{3-a}]$, in which $Q^2$ is a carbon atom or a silicon atom, and a plurality of $Q^2$, when present, may be the same as or different from each other;

$R^3$ is a single bond or an alkylene group optionally having a fluorine atom and optionally having an ether bond between carbon atoms, and a plurality of $R^3$, when present, may be the same as or different from each other;

$R^4$ is a hydrogen atom, a fluorine atom, an alkyl group optionally having a fluorine atom and optionally having an ether bond between carbon atoms, or $—R^5\text{-}Q^2[(\text{-}R^3\text{-}T)_b(\text{-}R^6)_{3-b}]$, and a plurality of $R^4$, when present, may be the same as or different from each other;

$R^5$ is a single bond or an alkylene group optionally having a fluorine atom and optionally having an ether bond between carbon atoms, and a plurality of $R^5$, when present, may be the same as or different from each other;

$R^6$ is a hydrogen atom, a fluorine atom, an alkyl group optionally having a fluorine atom and optionally having an ether bond between carbon atoms, or $—R^5\text{-}Q^2[(\text{-}R^3\text{-}T)_c(\text{-}R^7)_{3-c}]$, and a plurality of $R^6$, when present, may be the same as or different from each other;

$R^7$ is a hydrogen atom, a fluorine atom, or an alkyl group optionally having a fluorine atom and optionally having an ether bond between carbon atoms, and a plurality of $R^7$, when present, may be the same as or different from each other;

a is an integer of 0 to 3;

b is an integer of 0 to 3, and a plurality of b, when present, may be the same as or different from each other;

c is an integer of 0 to 3, and a plurality of c, when present, may be the same as or different from each other; and the sum of a, b, and c is n.

[5] The fluorine-containing ether compound according to [4], in which $R^3$ has 2 to 7 carbon atoms.

[6] The fluorine-containing ether compound according to any of [1] to [5], in which T is one or more selected from a bromine atom, an iodine atom, a hydroxy group, an amino group, a carboxy group, an aldehyde group, an epoxy group, a thiol group, a phosphate group, a phosphonate group, an unsaturated hydrocarbon group, an aryl group, and $—Si(R^{21})_{3-d}(L^{21})_d$, in which $R^{21}$ is an alkyl group;

$L^{21}$ is a hydrolyzable group or a hydroxy group, and a plurality of $L^{21}$ may be the same as or different from each other; and d is 2 or 3.

[7] A compound represented by formula (B1) or formula (B2) below:

$R^fO—(R^{f1}O)_m—R^1\text{-}L^1\text{-}R^2\text{-}Q^{11}(\text{-}CH═CH_2)_n$ formula (B1)

$(CH_2═CH\text{-})_nQ^{11}\text{-}R^2\text{-}L^1\text{-}R^1—O—(R^{f1}O)_m—R^1\text{-}L^1\text{-}R^2\text{-}Q^{11}(\text{-}CH═CH_2)_n$ formula (B2)

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^{11}$ is a (1+n)-valent linking group, and a plurality of $Q^{11}$, when present, may be the same as or different from each other;

m is an integer of 0 to 210; and n is an integer of 2 to 20, and a plurality of n, when present, may be the same as or different from each other.

[8] The compound according to [7], in which $\text{-}Q^{11}(\text{-}CH═CH_2)_n$ is $\text{-}Q_2[(\text{-}R^3—CH═CH_2)_a(—R^4)_{3-a}]$, in which $Q^2$ is a carbon atom or a silicon atom, and a plurality of $Q^2$, when present, may be the same as or different from each other;

$R^3$ is a single bond or an alkylene group optionally having a fluorine atom and optionally having an ether bond between carbon atoms, and a plurality of $R^3$, when present, may be the same as or different from each other;

$R^4$ is a hydrogen atom, a fluorine atom, an alkyl group optionally having a fluorine atom and optionally having an ether bond between carbon atoms, or $—R^5\text{-}Q^2[(\text{-}R^3—CH═CH_2)_b(—R^6)_{3-b}]$, and a plurality of $R^4$, when present, may be the same as or different from each other;

$R^5$ is a single bond or an alkylene group optionally having a fluorine atom and optionally having an ether bond between carbon atoms, and a plurality of $R^5$, when present, may be the same as or different from each other;

$R^6$ is a hydrogen atom, a fluorine atom, an alkyl group optionally having a fluorine atom and optionally having an ether bond between carbon atoms, or $—R^5\text{-}Q^2[(\text{-}R^3—CH═CH_2)_c(—R^7)_{3-c}]$, and a plurality of $R^6$, when present, may be the same as or different from each other;

$R^7$ is a hydrogen atom, a fluorine atom, or an alkyl group optionally having a fluorine atom and optionally having an ether bond between carbon atoms, and a plurality of $R^7$, when present, may be the same as or different from each other;

a is an integer of 0 to 3;

b is an integer of 0 to 3, and a plurality of b, when present, may be the same as or different from each other;

c is an integer of 0 to 3, and a plurality of c, when present, may be the same as or different from each other; and the sum of a, b, and c is n.

[9] A method for producing a compound represented by formula (B11) or formula (B12) below, the method including reacting a compound represented by formula (C1) or formula (C2) below with a compound represented by formula (D1) below:

$R^fO—(R^{f1}O)_m—R^1—C(═O)—OR^{11}$ formula (C1)

$R^{11}O—C(═O)—R^1—O—(R^{f1}O)_m—R^1—C(═O)—OR^{11}$ formula (C2)

$(CH_2═CH\text{-})_nQ^{11}\text{-}R^2—MgX$ formula (D1)

$R^fO—(R^{f1}O)_m—R^1\text{-}L^{11}\text{-}R^2\text{-}Q^{11}(\text{-}CH═CH_2)_n$ formula (B11)

$(CH_2═CH\text{-})_nQ^{11}\text{-}R^2\text{-}L^{11}\text{-}R^1—O—(R^{f1}O)_m—R^1\text{-}L^{11}\text{-}R^2\text{-}Q^{11}(\text{-}CH═CH_2)_n$ formula (B12)

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^{11}$ is —CH(OH)—, —C(═O)—, —CH═CH—, or $—CH_2—$, and a plurality of $L^{11}$, when present, may be the same as or different from each other;

$Q^{11}$ is a (1+n)-valent linking group, and a plurality of $Q^{11}$, when present, may be the same as or different from each other;

X is a halogen atom;

m is an integer of 0 to 210; and n is an integer of 2 to 20, and a plurality of n, when present, may be the same as or different from each other.

[10] A method for producing a fluorine-containing ether compound represented by formula (A11) or formula (A12) below, the method including introducing an adhesion group T into a compound represented by formula (B11) or formula (B12) below:

$R^fO—(R^{f1}O)_m—R^1\text{-}L^{11}\text{-}R^2\text{-}Q^{11}(\text{-}CH═CH_2)_n$ formula (B11)

$(CH_2═CH\text{-})_nQ^{11}\text{-}R^2\text{-}L^{11}\text{-}R^1—O—(R^{f1}O)_m—R^1\text{-}L^{11}\text{-}R^2\text{-}Q^{11}(\text{-}CH═CH_2)_n$ formula (B12)

$R^fO—(R^{f1}O)_m—R^1\text{-}L^{11}\text{-}R^2\text{-}Q^1(\text{-}T)_n$ formula (A11)

$(T\text{-})_nQ^1\text{-}R^2\text{-}L^{11}\text{-}R^1—O—(R^{f1}O)_m—R^1\text{-}L^{11}\text{-}R^2\text{-}Q^1(\text{-}T)_n$ formula (A12)

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^{11}$ is —CH(OH)—, —C(═O)—, —CH═CH—, or —$CH_2$—, and a plurality of $L^{11}$, when present, may be the same as or different from each other;

$Q^1$ is a (1+n)-valent linking group, and a plurality of $Q^1$, when present, may be the same as or different from each other;

$Q^{11}$ is a (1+n)-valent linking group, and a plurality of $Q^{11}$, when present, may be the same as or different from each other;

m is an integer of 0 to 210; and n is an integer of 2 to 20, and a plurality of n, when present, may be the same as or different from each other.

[11] A fluorine-containing ether composition containing a fluorine-containing ether compound represented by formula (A1) below and a fluorine-containing ether compound represented by formula (A2) below:

$$R^fO—(R^{f1}O)_m—R^1\text{-}L^1\text{-}R^2\text{-}Q^1(\text{-}T)_n \quad \text{formula (A1)}$$

$$(T\text{-})_nQ^1\text{-}R^2\text{-}L^1\text{-}R^1—O—(R^{f1}O)_m—R^1\text{-}L^1\text{-}R^2\text{-}Q^1(\text{-}T)_n \quad \text{formula (A2)}$$

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^1$ is a (1+n)-valent linking group, and a plurality of $Q^1$, when present, may be the same as or different from each other;

T is an adhesion group, and a plurality of T may be the same as or different from each other;

m is an integer of 0 to 210; and n is an integer of 2 to 20, and a plurality of n, when present, may be the same as or different from each other.

[12] A fluorine-containing ether composition containing one or more of the fluorine-containing ether compound according to any of [1] to [6] and an additional fluorine-containing ether compound.

[13] A coating liquid containing:

the fluorine-containing ether compound according to any of [1] to [6] or the fluorine-containing ether composition according to [11] or [12]; and a liquid medium.

[14] An article having a surface layer formed from the fluorine-containing ether compound according to any of [1] to [6] or the fluorine-containing ether composition according to [11] or [12] on a surface of a substrate.

[15] A method for producing an article, including forming a surface layer by a dry coating method or a wet coating method using the fluorine-containing ether compound according to any of [1] to [6], the fluorine-containing ether composition according to [11] or [12], or the coating liquid according to [13].

The above and other objects, features and advantages of the present disclosure will become more fully understood from the detailed description given hereinbelow and the accompanying drawings which are given by way of illustration only, and thus are not to be considered as limiting the present disclosure.

According to the present invention, provided are: a fluorine-containing ether compound, a fluorine-containing ether composition, and a coating liquid that are capable of forming a surface layer having excellent durability; an article that has a surface layer having excellent durability; and a compound that is useful as a raw material for a fluorine-containing ether compound.

DETAILED DESCRIPTION

In the present specification, a compound represented by formula (A1) is denoted as compound (A1). Compounds and others represented by other formulae also follow the above.

The following terms as used herein have the following meanings.

The term "reactive silyl group" is a generic term for a hydrolyzable silyl group and a silanol group (Si—OH). The reactive silyl group is, for example, T in formula (A1) or formula (A2), that is, $—Si(R)_{3-c}(L)_c$.

The term "hydrolyzable silyl group" means a group that can form a silanol group by a hydrolysis reaction.

The term "surface layer" means a layer formed on the surface of a substrate.

When a fluorine-containing ether compound is a mixture of a plurality of fluorine-containing ether compounds with different chain lengths of polyfluoropolyether chains, the "molecular weight" of the polyfluoropolyether chain is the number-average molecular weight calculated by determining the number (average value) of oxyfluoroalkylene units by $^1$H-NMR and $^{19}$F-NMR.

When a fluorine-containing ether compound is a fluorine-containing ether compound with a single chain length of polyfluoropolyether chain, the "molecular weight" of the polyfluoropolyether chain is the molecular weight calculated by determining the structure of $R^f$ by $^1$H-NMR and $^{19}$F-NMR.

A numerical range indicated by using "to" means that the numerical values described before and after "to" are included as the lower limit value and the upper limit value.

[Fluorine-Containing Ether Compound]

A fluorine-containing ether compound of the present invention (hereinafter, also referred to as "the present compound") is a fluorine-containing ether compound represented by formula (A1) or formula (A2) below:

$$R^fO—(R^{f1}O)_m—R^1\text{-}L^1\text{-}R^2\text{-}Q^1(\text{-}T)_n \quad \text{formula (A1)}$$

$$(T\text{-})_nQ^1\text{-}R^2\text{-}L^1\text{-}R^1—O—(R^{f1}O)_m—R^1\text{-}L^1\text{-}R^2\text{-}Q^1(\text{-}T)_n \quad \text{formula (A2)}$$

in which $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(=O)—, or —CH=CH—, and a plurality of $L^1$, when present, may be the same as or different from each other;

$Q^1$ is a (1+n)-valent linking group, and a plurality of $Q^1$, when present, may be the same as or different from each other;

T is an adhesion group, and a plurality of T may be the same as or different from each other;

m is an integer of 0 to 210; and n is an integer of 2 to 20, and a plurality of n, when present, may be the same as or different from each other.

The above present compound has a polyfluoropolyether chain [$R^f$—O—$(R^{f1}O)_m$—$R^1$] or [O—$(R^{f1}O)_m$—$R^1$], an adhesion group [T], and a particular linking group [-$L^1$-$R^2$—$O^1$], which links the polyfluoropolyether chain and the adhesion group.

Compound (A1) is a compound having the structure of "monovalent polyfluoropolyether chain-linking group-adhesion group", and compound (A2) is a compound having the structure of "adhesion group-linking group-divalent polyfluoropolyether chain-linking group-adhesion group".

The present compound has a polyfluoropolyether chain. The present compound having a polyfluoropolyether chain is excellent in fingerprint stain removability of the surface layer. Also, the present compound has two or more adhesion groups at a terminal on at least one side. The present compound, which has two or more adhesion groups at its terminal, is excellent in rub resistance of the surface layer because of its firm chemical bond with the substrate. Furthermore, the present compound has $L^1$, that is, —CH(OH)—, —C(=O)—, or —CH=CH—, between the polyfluoropolyether chain and $Q^1$ having a branched structure, in the aforementioned linking group. The present inventors have completed the present invention by finding that the presence of such substituent $L^1$ provides the present compound with excellent durability for the substrate surface. Although the action by which such a substituent improves durability is still unknown, it is assumed that, when the present compound is applied to the surface of a substrate, the interaction between such $L^1$ accelerates aligned arrangement of the present compound on the surface layer, resulting in improved durability. It is also assumed that, by interposing $Q^1$ between $L^1$ and the adhesion group T, the intramolecular reaction between $L^1$ and T that may occur due to the combination is suppressed, thereby sufficiently contributing to the adhesion of the adhesion group T to the substrate.

As described above, the surface layer formed by the present compound is characterized by excellent durability such as rub resistance, chemical resistance, and light resistance, and in particular, excellent rub resistance.

When $R^f$ is a fluoroalkyl group having 1 to 20 carbon atoms, the rub resistance and fingerprint stain removability of the surface layer are made further excellent. From the viewpoint of making the rub resistance and fingerprint stain removability of the surface layer further excellent, the number of carbon atoms in the fluoroalkyl group of $R^f$ is preferably 1 to 6, more preferably 1 to 4, and particularly preferably 1 to 3.

As the fluoroalkyl group of $R^f$, a perfluoroalkyl group is preferred from the viewpoint of making the rub resistance and fingerprint stain removability of the surface layer further excellent. The compound 1A in which $R^f$ is a perfluoroalkyl group has a terminal of $CF_3$—. Since the compound 1A having a terminal of $CF_3$— can form a surface layer with a low surface energy, the rub resistance and fingerprint stain removability of the surface layer are made further excellent.

Examples of the fluoroalkyl group of $R^f$ include $CF_3$—, $CF_3CF_2$—, $CF_3CF_2CF_2$—, $CF_3CF_2CF_2CF_2$—, $CF_3CF_2CF_2CF_2CF_2$—, $CF_3CF_2CF_2CF_2CF_2CF_2$—, and $CF_3CF(CF_3)$—.

As $(R^{f1}O)_m$, a structure represented by formula ($R^{f1}$-1) below is preferred from the viewpoint of making the rub resistance and fingerprint stain removability of the surface layer further excellent:

$$(R^{f11}O)_{m1}(R^{f12}O)_{m2}(R^{f13}O)_{m3}(R^{f14}O)_{m4}(R^{f15}O)_{m5}(R^{f16}O)_{m6} \quad \text{formula } (R^{f1}\text{-}1)$$

in which $R^{f11}$ is a fluoroalkylene group having 1 carbon atom;

$R^{f12}$ is a fluoroalkylene group having 2 carbon atoms;

$R^{f13}$ is a fluoroalkylene group having 3 carbon atoms;

$R^{f14}$ is a fluoroalkylene group having 4 carbon atoms;

$R^{f15}$ is a fluoroalkylene group having 5 carbon atoms;

$R^{f16}$ is a fluoroalkylene group having 6 carbon atoms; and m1, m2, m3, m4, m5, and m6 each independently represent an integer of 0 or 1 or more, m1+m2+m3+m4+m5+m6 is an integer of 1 to 210, and a plurality of $R^{f11}$ to $R^{f16}$, when present, may be the same as or different from each other.

Note that the bonding order of ($R^{f11}$O) to ($R^{f16}$O) in formula ($R^{f1}$-1) is arbitrary. m1 to m6 in formula (R-1) represent the number of ($R^{f11}$O) to ($R^{f16}$O), respectively, and not the arrangement. For example, $(R^{f15}O)_{m5}$ represents that the number of ($R^{f15}$O) is m5 and does not represent the block arrangement structure of $(R^{f5}O)_{m5}$. Similarly, the order in which ($R^{f11}$O) to ($R^{f16}$O) are described does not represent the bonding order of the respective units.

Also, the fluoroalkylene groups having 3 to 6 carbon atoms may be linear fluoroalkylene groups, or may be fluoroalkylene groups having a branched or ring structure.

Specific examples of $R^{f11}$ include CHF and $CF_2$. Specific examples of $R^{f12}$ include $CF_2CF_2$, $CF_2CHF$, and $CF_2CH_2$. Specific examples of $R^{f13}$ include $CF_2CF_2CF_2$, $CF_2CF_2CHF$, $CF_2CHFCF_2$, $CF_2CF_2CH_2$, $CF_2CH_2CF_2$, and $CF(CF_3)CF_2$. Specific examples of $R^{f14}$ include $CF_2CF_2CF_2CF_2$, $CF_2CF_2CF_2CH_2$, $CHFCF_2CF_2CF_2$, $CF_2CH_2CF_2CF_2$, $CF(CF_3)CF_2CF_2$, and a perfluorocyclobutane-1,2-diyl group. Specific examples of $R^{f15}$ include $CF_2CF_2CF_2CF_2CF_2$, $CF_2CF_2CF_2CF_2CH_2$, $CHFCF_2CF_2CF_2CF_2$, and $CF_2CF_2CH_2CF_2CF_2$. Specific examples of $R^{f16}$ include $CF_2CF_2CF_2CF_2CF_2CF_2$, $CF_2CF_2CF_2CF_2CF_2CH_2$, and $CF_2CF_2CF_2CF_2CF_2CHF$.

$R^1$ is an alkylene group optionally having a fluorine atom. As $R^1$, a fluoroalkylene group is preferred from the viewpoint of making the rub resistance and fingerprint stain removability of the surface layer further excellent. The alkylene group of $R^1$ is preferably a linear fluoroalkylene group. Also, the number of carbon atoms in the alkylene group of $R^1$ is preferably 1 to 6.

$R^2$ is a single bond or an alkylene group optionally having a fluorine atom. When $R^2$ is a single bond, $L^1$-$R^2$-$Q^1$ can also be represented as $L^1$-$Q^1$. As $R^2$, a single bond or an alkylene group is preferred from the viewpoint of synthesis of the present compound. The alkylene group of $R^2$ is preferably a linear fluoroalkylene group. Also, the number of carbon atoms in the alkylene group of $R^2$ is preferably 1 to 10, and more preferably 1 to 6.

Above all, when $L^1$ is —CH(OH)— or —C(=O)—, from the viewpoint of synthesis of the present compound, $R^2$ is preferably a single bond or an alkylene group having 1 to 10 carbon atoms, and more preferably a single bond or an alkylene group having 1 to 6 carbon atoms. When $L^1$ is —CH=CH—, from the viewpoint of synthesis of the present compound, $R^2$ is preferably a single bond or an alkylene group having 1 to 9 carbon atoms, and more preferably a single bond or an alkylene group having 1 to 5 carbon atoms.

$L^1$ is —CH(OH)—, —C(=O)—, or —CH=CH—, which improves the durability of the surface layer using the present compound.

$Q^1$ is a (1+n)-valent linking group, which links n adhesion groups to the polyfluoropolyether chain. $Q^1$ is a group having a branching point, and examples of such a branching point include a tertiary carbon atom, a quaternary carbon atom, a silicon atom, and a ring structure.

Examples of the ring structure constituting a branching point include a 3- to 8-membered aliphatic ring, a 6- to 8-membered aromatic ring, a 3- to 8-membered heterocycle, and a fused ring consisting of two or more of these rings, from the viewpoint of ease of producing the present compound and the durability of the surface layer such as rub resistance, chemical resistance, and light resistance. From the viewpoint of the durability of the surface layer such as rub resistance, chemical resistance, and light resistance, a ring structure selected from a 3- to 8-membered aliphatic ring, a 6- to 8-membered aromatic ring, and a fused ring of them is preferred. Examples of the ring structure constituting a branching point include ring structures represented by the formulae below. The ring structures below may be substituted with a fluorine atom. The ring structures may also have an alkyl group, a cycloalkyl group, an alkenyl group, an allyl group, or other groups that optionally have a halogen atom as a substituent.

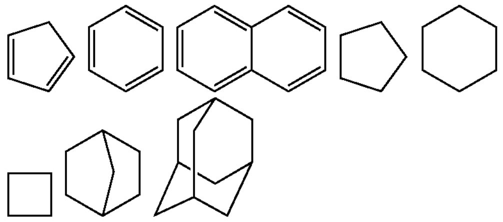

The branching point constituting $Q^1$ in the present compound is preferably a tertiary carbon atom, a quaternary carbon atom, or a silicon atom, from the viewpoint of ease of synthesis of the present compound and the durability of the surface layer. Above all, from the viewpoint of ease of synthesis and the durability of the surface layer, it is preferable that $-Q^1(-T)_n$ be a structure represented by $-Q^2[(-R^3-T)_a(-R^4)_{3-a}]$:

in which $Q^2$ is a carbon atom or a silicon atom, and a plurality of $Q^2$, when present, may be the same as or different from each other;

$R^3$ is a single bond or an alkylene group optionally having a fluorine atom and optionally having an ether bond between carbon atoms, and a plurality of $R^3$, when present, may be the same as or different from each other;

$R^4$ is a hydrogen atom, a fluorine atom, an alkyl group optionally having a fluorine atom and optionally having an ether bond between carbon atoms, or $—R^5-Q^2[(-R^3-T)_b(-R^6)_{3-b}]$, and a plurality of $R^4$, when present, may be the same as or different from each other;

$R^5$ is a single bond or an alkylene group optionally having a fluorine atom and optionally having an ether bond between carbon atoms, and a plurality of $R^5$, when present, may be the same as or different from each other;

$R^6$ is a hydrogen atom, a fluorine atom, an alkyl group optionally having a fluorine atom and optionally having an ether bond between carbon atoms, or $—R^5-Q^2[(-R^3-T)_c(-R^7)_{3-c}]$, and a plurality of $R^6$, when present, may be the same as or different from each other;

$R^7$ is a hydrogen atom, a fluorine atom, or an alkyl group optionally having a fluorine atom and optionally having an ether bond between carbon atoms, and a plurality of $R^7$, when present, may be the same as or different from each other;

a is an integer of 0 to 3;

b is an integer of 0 to 3, and a plurality of b, when present, may be the same as or different from each other;

c is an integer of 0 to 3, and a plurality of c, when present, may be the same as or different from each other; and the sum of a, b, and c is n.

$Q^2$ above represents a carbon atom or a silicon atom that serves as a branching point.

When $R^3$ is a single bond, the adhesion group T is directly bonded to $Q^2$ and can also be represented as $Q^2$-T. From the viewpoint of ease of synthesis, $R^3$ is preferably an alkylene group having 2 to 10 carbon atoms that optionally has a fluorine atom and optionally has an ether bond between carbon atoms. Examples of the alkyl groups in $R^4$, $R^6$, and $R^7$ include alkyl groups having 1 to 6 carbon atoms that optionally has a fluorine atom and optionally has an ether bond between carbon atoms.

As the alkylene group in $R^5$, an alkylene group having 2 to 10 carbon atoms that optionally has a fluorine atom and optionally has an ether bond between carbon atoms is preferred.

Examples of the alkyl group in include an alkyl group having 1 to 6 carbon atoms that optionally has a fluorine atom and optionally has an ether bond between carbon atoms.

a, b, and c are each independently an integer of 0 to 3, and the sum of a, b, and c is n. When a plurality of b and c are present, the sum of the plurality of b and c and a is n. n is an integer of 2 to 20, and is preferably 2 to 10.

T is a group that is arranged on the substrate surface side at the time of surface layer formation and exhibits adhesion to the substrate. T may be one that forms a chemical bond with the substrate surface or the like, or it may be one that is chemisorbed or physisorbed to the substrate surface. From the viewpoint of durability, T is preferably one that is chemically bonded to the substrate surface.

Examples of the adhesion group T include a bromine atom, an iodine atom, a hydroxy group, an amino group, a carboxy group, an aldehyde group, an epoxy group, a thiol group, a phosphate group, a phosphonate group, an unsaturated hydrocarbon group, an aryl group, and $—Si(R^{21})_{3-d}(L^{21})_d$, and it is preferable to make selection as appropriate depending on the material of the substrate to be applied.

Examples of the amino group in the adhesion group T include $—NR^8R^9$ in which $R^8$ and $R^9$ are each independently a hydrogen atom or an alkyl group, and above all, $—NH_2$ is preferred from the viewpoint of the durability of the surface layer.

Examples of the phosphate group in the adhesion group T include —OP(═O)(OR$^{10}$)$_2$ in which R$^{10}$ is a hydrogen atom or an alkyl group and a plurality of R$^{10}$ may be the same as or different from each other, and above all, —OP(═O)(OH)$_2$ is preferred from the viewpoint of the durability of the surface layer.

Examples of the phosphonate group in the adhesion group T include —P(═O)(OR$^{10}$)$_2$ in which R$^{10}$ is the same as defined above, and above all, —P(═O)(OH)$_2$ is preferred from the viewpoint of the durability of the surface layer.

Examples of the unsaturated hydrocarbon group in the adhesion group T include an acryloyl group, a methacryloyl group, and a vinyl group.

Examples of the aryl group in the adhesion group T include a phenyl group, a naphthyl group, and an anthracenyl group.

Also, —Si(R$^{21}$)$_{3-d}$(L$^{21}$)$_d$ in the adhesion group T represents a reactive silyl group.

The reactive silyl group is a group in which one or both of a hydrolyzable group and a hydroxy group is bonded to a silicon atom.

The hydrolyzable group is a group that becomes a hydroxy group by a hydrolysis reaction. That is, the hydrolyzable silyl group becomes a silanol group (Si—OH) by a hydrolysis reaction. The silanol group further undergoes an intermolecular dehydration condensation reaction to form a Si—O—Si bond. The silanol group also undergoes a dehydration condensation reaction with a hydroxy group on the substrate surface (substrate-OH) to form a chemical bond (substrate-O—Si).

Examples of the hydrolyzable group include an alkoxy group, a halogen atom, an acyl group, and an isocyanate group. As the alkoxy group, an alkoxy group having 1 to 6 carbon atoms is preferred.

As the halogen atom, a chlorine atom is preferred.

As the hydrolyzable group, an alkoxy group or a halogen atom is preferred from the viewpoint of ease of producing the present compound. As the hydrolyzable group, an alkoxy group having 1 to 4 carbon atoms is preferred from the viewpoint of low outgassing during application and excellent storage stability of the present compound, an ethoxy group is particularly preferred when the present compound needs to have long term storage stability, and a methoxy group is particularly preferred when the reaction time after coating is set to a short time.

The number of carbon atoms in the alkyl group of R$^{21}$ is preferably 1 to 6, more preferably 1 to 3, and particularly preferably 1 to 2, from the viewpoint of ease of producing the present compound.

d is preferably 2 or 3, and more preferably 3, from the viewpoint of making the adhesion between the surface layer and the substrate stronger.

Suitable combinations of the adhesion group T with the substrate and material are exemplified in the form of "adhesion group T—substrate":

bromine atom—silicon nitride, hydrogen-terminated silicon nitride;

iodine atom—hydrogen-terminated diamond;

hydroxy group—hydrogen-terminated silicon, halogenated silicon, silicon oxide ($SiO_2$), aluminum oxide ($Al_2O_3$), diamond-like carbon (DLC);

amino group—indium tin oxide (ITO), mica;

carboxy group—$Al_2O_3$, silver oxide (AgO), copper oxide (CuO), zirconium-modified aluminum oxide (Zr/$Al_2O_3$), amine-terminated oxide ($NH_2$-terminated oxide), tin oxide (SnO2);

aldehyde group, epoxy group—hydrogen-terminated silicon, halogenated silicon;

thiol group—gold (Au);

phosphate group, phosphonate group—zirconium oxide ($ZrO_2$), titanium oxide ($TiO_2$), $Al_2O_3$, tantalum oxide ($Ta_2O_5$), Zr/$Al_2O_3$;

unsaturated hydrocarbon group—hydrogen-terminated diamond, hydrogen-terminated silicon, halogenated silicon, silicon nitride, hydrogen-terminated silicon nitride, polyimide (PI), acryl;

aryl group—$Al_2O_3$, DLC; and reactive silyl group—glass, Au, mica, $SiO_2$, tin oxide ($SnO_2$), germanium oxide ($GeO_2$), $ZrO_2$, $TiO_2$, $Al_2O_3$, ITO, stainless steel (SUS), lead zirconate titanate (PZT).

However, the combination is not limited to these combinations, and the present compound can be used in combination with a variety of substrates.

Examples of the present compound include compounds of the formulae below. The compounds of the formulae below are industrially easy to be produced, are easy to be handled, and are further excellent in water and oil repellency, rub resistance, fingerprint stain removability, lubricity, chemical resistance, light resistance, and chemical resistance of the surface layer. Also, from the viewpoint of durability, it is preferable that the present compound have a weight average molecular weight (Mw)/number average molecular weight (Mn) of 1.2 or less.

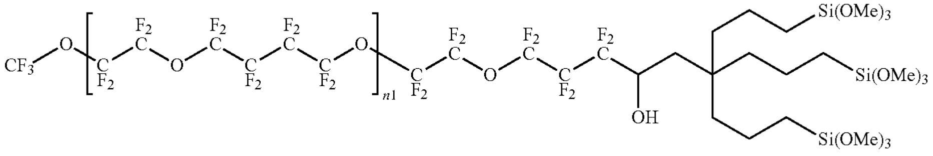

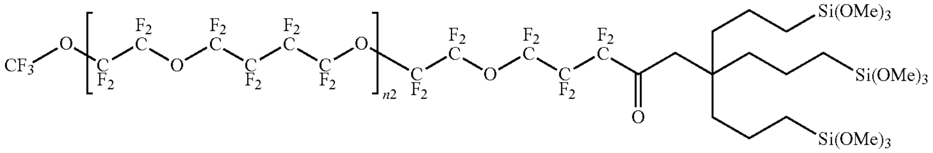

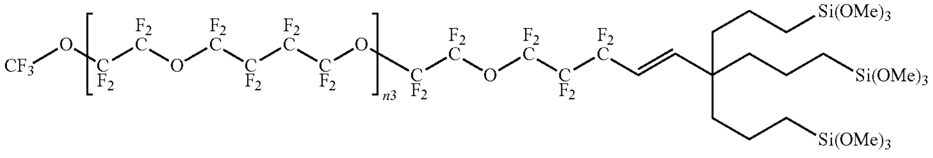

-continued

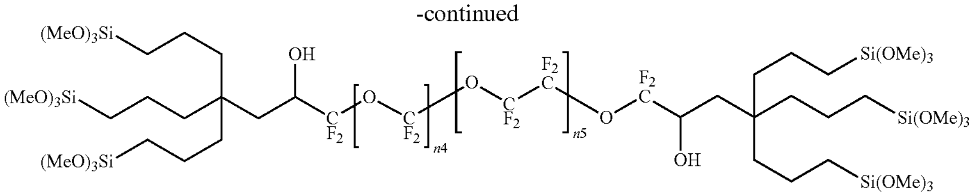

n1 to n5 are adjusted so that m in formula (A1) or formula (A2) is 0 to 210.

[Compound Represented by Formula (B1) or Formula (B2) Below]

Compound (B1) and compound (B2) below are compounds in which the adhesion group T in the aforementioned present compound corresponds to an unsaturated hydrocarbon group, and are also compounds useful for synthesizing the aforementioned compound (A1) and compound (A2):

$$R^fO—(R^{f1}O)_m—R^1\text{-}L^1\text{-}R^2\text{-}Q^{11}(\text{-}CH{=}CH_2)_n \qquad \text{formula (B1)}$$

$$(CH_2{=}CH\text{-})_nQ^{11}\text{-}R^2\text{-}L^1\text{-}R^1—O—(R^{f1}O)_m—R^1\text{-}L^1\text{-}R^2\text{-}Q^{11}(\text{-}CH{=}CH_2)_n \qquad \text{formula (B2)}$$

in which $R^f$, $R^{f1}$, $R^1$, $R^2$, $L^1$, m, and n are the same as in the aforementioned formula (A1) and formula (A2), and the preferred aspects are also the same.

When ($—CH{=}CH_2$) in formula (B1) and formula (B2) is used as the adhesion group T, $Q^{11}$ is the same as $Q^1$ in the aforementioned formula (A1) and formula (A2). In the case of introducing an additional adhesion group T to compound (B1) or compound (B2), $Q^{11}(\text{-}CH{=}CH_2)$ is a (1+n)-valent linking group that becomes $Q^1$ after a reaction.

In compound (B1) and compound (B2), it is preferable that $\text{-}Q^{11}(\text{-}CH{=}CH_2)_n$ be $\text{-}Q^2[(\text{-}R^{23}—CH{=}CH_2)_a(—R^{24})_{3\text{-}a}]$:

in which $Q^2$, a, b, and c are the same as in the aforementioned compound (A1) and compound (A2), and the preferred aspects are also the same;

$R^{23}$ is a single bond or an alkylene group optionally having a fluorine atom and optionally having an ether bond between carbon atoms, and a plurality of $R^{23}$, when present, may be the same as or different from each other;

$R^{24}$ is a hydrogen atom, a fluorine atom, an alkyl group optionally having a fluorine atom and optionally having an ether bond between carbon atoms, or $—R^{25}\text{-}Q^2[(\text{-}R^{23}—CH{=}CH_2)_b(—R^{26})_{3\text{-}b}]$, and a plurality of $R^{24}$, when present, may be the same as or different from each other;

$R^{25}$ is a single bond or an alkylene group optionally having a fluorine atom and optionally having an ether bond between carbon atoms, and a plurality of $R^{25}$, when present, may be the same as or different from each other;

$R^{26}$ is a hydrogen atom, a fluorine atom, an alkyl group optionally having a fluorine atom and optionally having an ether bond between carbon atoms, or $—R^{25}\text{-}Q^2[(\text{-}R^{23}—CH{=}CH_2)_c(—R^{27})_{3\text{-}c}]$, and a plurality of $R^{26}$, when present, may be the same as or different from each other; and $R^{27}$ is a hydrogen atom, a fluorine atom, or an alkyl group optionally having a fluorine atom and optionally having an ether bond between carbon atoms, and a plurality of $R^{27}$, when present, may be the same as or different from each other.

$R^{23}—CH{=}CH_2$ is a group that becomes $R^3$ in the aforementioned compound (A1) and compound (A2) after introducing the adhesion group.

Also, $R^{24}$, $R^{25}$, $R^{26}$, and $R^{27}$ are groups that become $R^4$, $R^5$, $R^6$, and $R^7$ in the aforementioned compound (A1) and compound (A2) after introducing the adhesion group.

Examples of compound (B1) and compound (B2) include compounds of the formulae below.

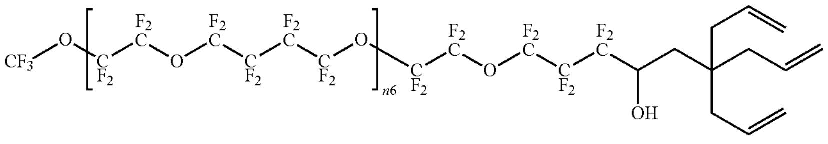

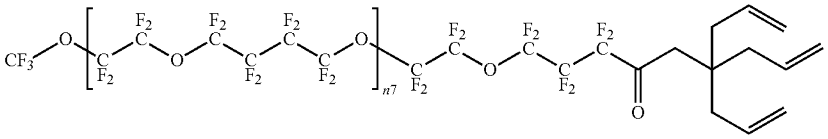

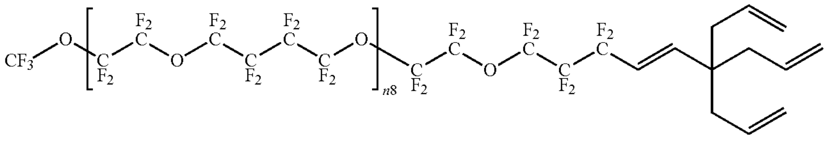

-continued

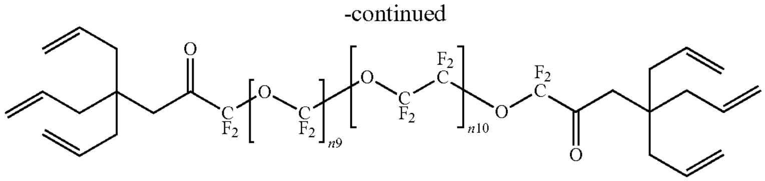

n6 to n10 are adjusted so that m in formula (B1) or formula (B2) is 0 to 210.

(Method for Producing Compound (B1), Compound (B2), and the Like)

Examples of the method for producing compound (B11) and compound (B12) including the aforementioned compound (B1) and compound (B2) include a method for producing compounds, the method including reacting a compound represented by formula (C1) or formula (C2) below with a compound represented by formula (D1) below:

$R^fO—(R^{f1}O)_m—R^1—C(=O)—OR^{11}$ formula (C1)

$R^{11}O—C(=O)—R^1—O—(R^{f1}O)_m—R^1—C(=O)—OR^{11}$ formula (C2)

$(CH_2=CH-)_nQ^{11}-R^2—MgX$ formula (D1)

$R^fO—(R^{f1}O)_m—R^1-L^{11}-R^2-Q^{11}(-CH=CH_2)_n$ formula (B11)

$(CH_2=CH-)_nQ^{11}-R^2-L^{11}-R^1—O—(R^{f1}O)_m—R^1-L^{11}-R^2-Q^{11}(-CH=CH_2)_n$ formula (B12)

in which $R^f$, $R^{f1}$, $R^1$, $R^2$, $Q^{11}$, m, and n are as mentioned above, and the preferred aspects are also the same.

$R^{11}$ is a leaving group, preferably an alkyl group, and more preferably a methyl group. A plurality of $R^{11}$, when present, may be the same as or different from each other.

$L^{11}$ is —CH(OH)—, —C(=O)—, —CH=CH—, or —$CH_2$—, and a plurality of $L^{11}$, when present, may be the same as or different from each other.

X is a halogen atom, and is preferably a chlorine atom, a bromine atom, or an iodine atom.

Note that compound (B11) and compound (B12) only differ in that the moiety ($L^{11}$) corresponding to $L^1$ of compound (B1) and compound (B2) may be —$CH_2$—.

For example, by allowing the ester of compound (C1) or (C2) to react with 2 equivalents of compound (D1) and to undergo an acid treatment, compound (B11) or (B12) in which $L^{11}$ is —CH(OH)— or —C(=O)— can be obtained. In the above reaction, as the reaction time is lengthened, the compound in which $L^{11}$ is —CH(OH)— is dominantly generated.

By oxidizing the aforementioned compound (B11) or (B12) in which $L^{11}$ is —CH(OH)—, compound (B11) or (B12) in which $L^{11}$ is —C(=O)— can be obtained. As the oxidizing agent in such an oxidation reaction, known oxidizing agents such as Dess-Martin reagent can be used.

On the other hand, by reducing the aforementioned compound (B11) or (B12) in which $L^{11}$ is —C(=O)—, compound (B11) or (B12) in which $L^{11}$ is —CH(OH)— can be obtained. As the reducing agent in such a reduction reaction, known reducing agents such as lithium aluminum hydride can be used.

By dehydrating the aforementioned compound (B11) or (B12) in which $L^{11}$ is —CH(OH)— using triphenylphosphine or the like, compound (B11) or (B12) in which $L^{11}$ is —CH=CH— can be obtained.

Also, by dehydroxylating the aforementioned compound (B11) or (B12) in which $L^{11}$ is —CH(OH)— with hydrides or radicals, compound (B11) or (B12) in which $L^{11}$ is —$CH_2$— can be obtained.

Compound (C1) and compound (C2) can be synthesized by referring to, for example, International Patent Publication No. WO 2013/121984.

Compound (D1) can be produced by, for example, a method for allowing compound (D2) below to react with metallic magnesium:

$((CH_2=CH-)_nQ^{11}-R^2—X$ formula (D2)

in which $R^2$, $Q^{11}$, X, and n in the formula are the same as in compound (D1).

Suitable specific examples of compound (D2) include those described below.

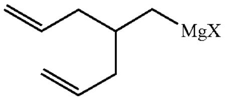

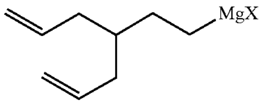

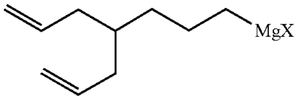

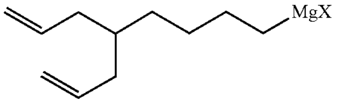

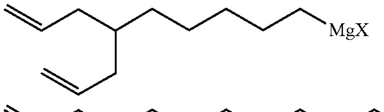

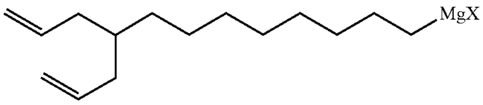

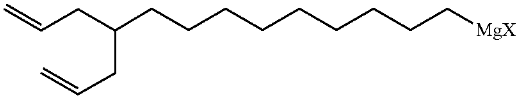

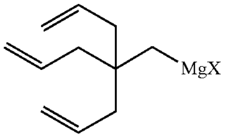

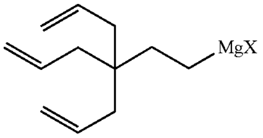

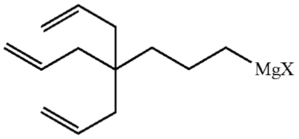

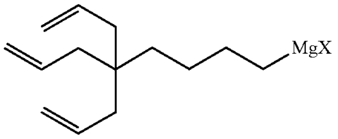

-continued

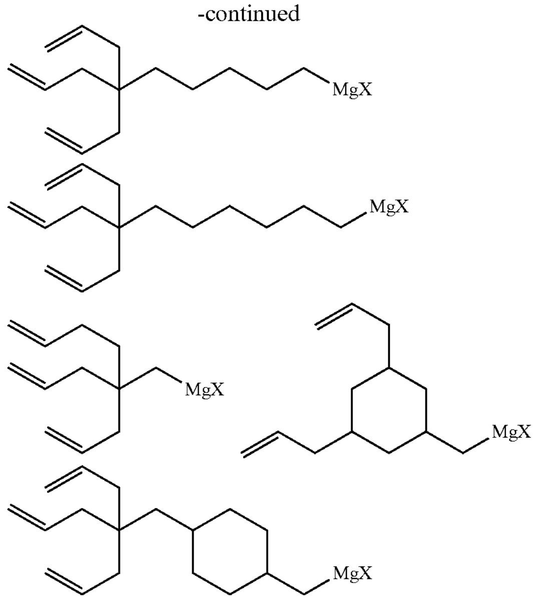

The above reaction is normally carried out in a solvent. The solvent can be selected as appropriate from solvents that can dissolve the aforementioned compound (C1), compound (C2), and compound (D1) for use. The solvent may be one type of solvent alone, or two or more types of solvents are combined into a mixed solvent.

For example, when compound (C1) or compound (C2) is a compound with a relatively low fluorine atom content (proportion of fluorine atoms in the molecular weight of the compound molecule), the solvent is not particularly limited as long as it is a solvent that is inert to the reaction. As the solvent that is inert to the reaction, above all, an ether-based solvent such as diethyl ether, tetrahydrofuran, or dioxane is preferred, and tetrahydrofuran is more preferred.

When compound (C1) or compound (C2) is a compound with a relatively high fluorine atom content, a mixed solvent combining the aforementioned ether-based solvent and a fluorinated solvent is preferred.

Examples of the fluorinated solvent include: hydrofluorocarbons (such as 1H,4H-perfluorobutane, 1H-perfluorohexane, 1,1,1,3,3-pentafluorobutane, 1,1,2,2,3,3,4-heptafluorocyclopentane, and 2H,3H-perfluoropentane); hydrochlorofluorocarbons (such as 3,3-dichloro-1,1,1,2,2-pentafluoropropane and 1,3-dichloro-1,1,2,2,3-pentafluoropropane (HCFC-225cb)); hydrofluoroethers (such as $CF_3CH_2OCF_2CF_2H$ (AE3000), (perfluorobutoxy)methane, and (perfluorobutoxy)ethane); hydrochlorofluoroolefins (such as (Z)-1-chloro-2,3,3,4,4,5,5-heptafluoro-1-pentene (HCFO-1437dycc (Z) isomer), (E)-1-chloro-2,3,3,4,4,5,5-heptafluoro-1-pentene (HCFO-1437dycc (E) isomer), (Z)-1-chloro-2,3,3-trifluoro-1-propene (HCFO-1233yd (Z) isomer), and (E)-1-chloro-2,3,3-trifluoro-1-propene (HCFO-1233yd (E) isomer)); and fluorine-containing aromatic compounds (such as perfluorobenzene, m-bis(trifluoromethyl)benzene (SR-solvent), and p-bis(trifluoromethyl)benzene).

(Method for Producing Compound (A11) and Compound (A12))

Examples of the method for producing compound (A11) and compound (A12) including the aforementioned compound (A1) and compound (A2) include a method for producing compounds, the method including introducing an adhesion group T into the aforementioned compound (B11) or compound (B12):

$R^fO—(R^{f1}O)_m—R^1\text{-}L^{11}\text{-}R^2\text{-}Q^1(\text{-}T)_n$ formula (A11)

$(T\text{-})_nQ^1\text{-}R^2\text{-}L^{11}\text{-}R^1—O—(R^{f1}O)_m—R^1\text{-}L^{11}\text{-}R^2\text{-}Q^1(\text{-}T)_n$ formula (A12)

in which $R^f$, $R^{f1}$, $R^1$, $R^2$, $L^{11}$, $Q^1$, $Q^{11}$, m, and n are as mentioned above, and the preferred aspects are also the same.

Hereinafter, the methods for introducing the respective adhesion groups T will be described with an example, but they are not limited to the following methods.

For example, by allowing compound (E1) below to act on the double bond of the aforementioned compound (B11) or compound (B12) to undergo a hydrosilylation reaction, compound (A11) or compound (A12) in which the adhesion group T is $—Si(R^{21})_{3\text{-}d}(L^{21})_d$ can be obtained:

$HSi(R^{21})_{3\text{-}d}(L^{21})_d$ formula (E1)

in which $R^{21}$, $L^{21}$, and d are as mentioned above, and the preferred aspects are also the same.

By allowing a peroxy acid such as meta-chloroperoxybenzoic acid, peracetic acid, or potassium hydrogen persulfate to act on the double bond of the aforementioned compound (B11) or compound (B12) to undergo epoxidation, compound (A11) or compound (A12) in which the adhesion group T is an epoxy group can be obtained.

By ozonating the double bond of the aforementioned compound (B11) or compound (B12) to form an ozonide, which is then subjected to an oxidation treatment with hydrogen peroxide or the like, for example, compound (A11) or compound (A12) in which the adhesion group T is a carboxy group can be obtained.

Also, by subjecting the aforementioned ozonide to a reduction treatment with a reducing agent such as zinc, dimethyl sulfide, or thiourea, compound (A11) or compound (A12) in which the adhesion group T is an aldehyde group can be obtained.

By adding an organoborane ($(R^{22})_3B$; in which $R^{22}$ is a hydrogen atom or an organic group) to the double bond of the aforementioned compound (B11) or compound (B12) to form a borohydride, with which bromine ($Br_2$) or iodine (12) is then allowed to react under basicity, compound (A11) or compound (A12) in which the adhesion group T is a bromine atom or an iodine atom can be obtained. Furthermore, by allowing a phosphorous ester to act on compound (A11) or compound (A12) in which the adhesion group T is a bromine or an iodine atom, which is then subjected to hydrolysis using hydrochloric acid or the like, compound (A11) or compound (A12) in which the adhesion group T is phosphonic acid can be obtained.

By allowing hydrogen peroxide to react with the aforementioned borohydride under basicity, compound (A11) or compound (A12) in which the adhesion group T is a hydroxy group can be obtained. Furthermore, by allowing activated phosphoric acid such as phosphoryl chloride to act on compound (A11) or compound (A12) in which the adhesion group T is a hydroxy group, compound (A11) or compound (A12) in which the adhesion group T is phosphoric acid can be obtained.

Also, by allowing an amine to react with the aforementioned compound (A11) or compound (A12) in which the adhesion group T is an aldehyde group to form an imine or iminium ion, which is then subjected to hydride reduction, compound (A11) or compound (A12) in which the adhesion group T is an amino group can be obtained.

A fluorine-containing compound-containing composition of the present invention (fluorine-containing ether composition, hereinafter, also referred to as "the present composition") may be one that contains compound (A1) and compound (A2), or may be one that contains one or more selected from compound (A1) and compound (A2), and an additional fluorine-containing ether compound. Note that the present composition does not contain a liquid medium, which will be mentioned later.

Examples of the additional fluorine-containing ether compound include fluorine-containing ether compounds byproduced in the production step of the present compound (hereinafter, also referred to as "byproduced fluorine-containing ether compounds"), and known fluorine-containing ether compounds and fluorine-containing oils used for the same applications as the present compound. As the additional fluorine-containing compound, a compound that is less likely to degrade the characteristics of the present compound is preferred.

Examples of the fluorine-containing oil include polytetrafluoroethylene (PTFE), ethylene-chlorotrifluoroethylene copolymer (ECTFE), polyvinylidene fluoride (PVDF), polyvinyl fluoride (PVF), and polychlorotrifluoroethylene (PCTFE).

Examples of the byproduced fluorine-containing compound include unreacted fluorine-containing compounds during synthesis of the present compound. When the present composition contains a byproduced fluorine-containing compound, a purification step for removing such a byproduced fluorine-containing compound or for reducing the amount of such a byproduced fluorine-containing compound can be simplified.

Examples of the known fluorine-containing compound include those described in the following literatures:

a perfluoropolyether-modified aminosilane described in Japanese Unexamined Patent Application Publication No. H11-029585;

a silicon-containing organic fluorine-containing polymer described in Japanese Patent No. 2874715;

an organic silicon compound described in Japanese Unexamined Patent Application Publication No. 2000-144097;

a perfluoropolyether-modified aminosilane described in Japanese Unexamined Patent Application Publication No. 2000-327772;

a fluorinated siloxane described in Published Japanese Translation of PCT International Publication for Patent Application, No. 2002-506887;

an organic silicone compound described in Published Japanese Translation of PCT International Publication for Patent Application, No. 2008-534696;

a fluorination-modified hydrogen-containing polymer described in Japanese Patent No. 4138936;

compounds described in U.S. Patent Application Serial No. 2010/0129672, International Patent Publication No. WO 2014/126064, and Japanese Unexamined Patent Application Publication No. 2014-070163;

organosilicon compounds described in International Patent Publication No. WO 2011/060047 and International Patent Publication No. WO 2011/059430;

a fluorine-containing organosilane compound described in International Patent Publication No. WO 2012/064649;

a fluorooxyalkylene group-containing polymer described in Japanese Unexamined Patent Application Publication No. 2012-72272;

fluorine-containing ether compounds described in International Patent Publication No. WO 2013/042732, International Patent Publication No. WO 2013/121984, International Patent Publication No. WO 2013/121985, International Patent Publication No. WO 2013/121986, International Patent Publication No. WO 2014/163004, Japanese Unexamined Patent Application Publication No. 2014-080473, International Patent Publication No. WO 2015/087902, International Patent Publication No. WO 2017/038830, International Patent Publication No. WO 2017/038832, and International Patent Publication No. WO 2017/187775;

perfluoro(poly)ether-containing silane compounds described in Japanese Unexamined Patent Application Publication No. 2014-218639, International Patent Publication No. WO 2017/022437, International Patent Publication No. WO 2018/079743, and International Patent Publication No. WO 2018/143433;

fluoropolyether group-containing polymer-modified silanes described in Japanese Unexamined Patent Application Publication No. 2015-199906, Japanese Unexamined Patent Application Publication No. 2016-204656, Japanese Unexamined Patent Application Publication No. 2016-210854, and Japanese Unexamined Patent Application Publication No. 2016-222859; and fluorine-containing ether compounds described in International Patent Publication No. WO 2018/216630, International Patent Publication No. WO 2019/039226, International Patent Publication No. WO 2019/039341, International Patent Publication No. WO 2019/039186, International Patent Publication No. WO 2019/044479, Japanese Unexamined Patent Application Publication No. 2019-44158, and International Patent Publication No. WO 2019/163282.

Also, examples of commercially available products of the fluorine-containing compound include the KY-100 series (such as KY-178, KY-185, and KY-195) manufactured by Shin-Etsu Chemical Co., Ltd.; Afluid (register trade mark) 5550 manufactured by AGC Inc.; and OPTOOL (register trade mark) DSX, OPTOOL (register trade mark) AES, OPTOOL (register trade mark) UF503, and OPTOOL (register trade mark) UD509 manufactured by Daikin Industries, Ltd.

The proportion of the present compound in the present composition is less than 100% by mass, preferably 60% by mass or more, more preferably 70% by mass or more, and still more preferably 80% by mass or more.

When the present composition contains an additional fluorine-containing compound, the proportion of the additional fluorine-containing compound to the present compound and the additional fluorine-containing compound in total in the present composition is preferably 40% by mass or less, more preferably 30% by mass or less, and still more preferably 20% by mass or less.

The proportion of the present compound and the additional fluorine-containing compound in total in the present composition is preferably 80% by mass or more, and more preferably 85% by mass or more.

When the contents of the present compound and the additional fluorine-containing compound are within the aforementioned ranges, the surface layer has excellent water and oil repellency, rub resistance, fingerprint stain removability, lubricity, and appearance.

[Coating Liquid]

A coating liquid of the present invention (hereinafter, also referred to as the present coating liquid) contains the present compound or the present composition and a liquid medium. The present coating liquid only needs to be in the form of a liquid, which may be a solution or a dispersion.

The present coating liquid only needs to contain the present compound or the present composition, and may contain impurities such as byproducts generated in the production step of the present compound.

The concentration of the present compound or the present composition in the present coating liquid is preferably 0.001 to 40% by mass, preferably 0.01 to 20% by mass, and more preferably 0.1 to 10% by mass.

As the liquid medium, an organic solvent is preferred. The organic solvent may be a fluorinated organic solvent, may be a non-fluorinated organic solvent, or may include both solvents.

Examples of the fluorinated organic solvent include a fluorinated alkane, a fluorinated aromatic compound, a fluoroalkyl ether, a fluorinated alkylamine, and a fluoroalcohol.

As the fluorinated alkane, a compound having 4 to 8 carbon atoms is preferred. Examples of commercially available products thereof include $C_6F_{13}H$ (manufactured by AGC Inc., Asahiklin (register trade mark) AC-2000), $C_6F_{13}C_2H_5$ (manufactured by AGC Inc., Asahiklin (register trade mark) AC-6000), and $C_2F_5CHFCHFCF_3$ (manufactured by The Chemours Company, Vertrel (register trade mark) XF).

Examples of the fluorinated aromatic compound include hexafluorobenzene, trifluoromethylbenzene, perfluorotoluene, and bis(trifluoromethyl)benzene.

As the fluoroalkyl ether, a compound having 4 to 12 carbon atoms is preferred. Examples of commercially available products thereof include $CF_3CH_2OCF_2CF_2H$ (manufactured by AGC Inc., Asahiklin (register trade mark) AE-3000), $C_4F_9OCH_3$ (manufactured by 3M Company, Novec (register trade mark) 7100), $C_4F_9OC_2H_5$ (manufactured by 3M Company, Novec (register trade mark) 7200), and $C_2F_5CF(OCH_3)C_3F_7$ (manufactured by 3M Company, Novec (register trade mark) 7300).

Examples of the fluorinated alkylamine include perfluorotripropylamine and perfluorotributylamine.

Examples of the fluoroalcohol include 2,2,3,3-tetrafluoropropanol, 2,2,2-trifluoroethanol, and hexafluoroisopropanol.

As the non-fluorinated organic solvent, a compound consisting only of hydrogen atoms and carbon atoms and a compound consisting only of hydrogen atoms, carbon atoms, and oxygen atoms are preferred, and examples thereof include a hydrocarbon-based organic solvent, an alcohol-based organic solvent, a ketone-based organic solvent, an ether-based organic solvent, and an ester-based organic solvent.

The present coating liquid preferably contains the liquid medium with a content of 75 to 99.999% by mass, preferably with a content of 85 to 99.99% by mass, and particularly preferably with a content of 90 to 99.9% by mass.

The present coating liquid may contain, in addition to the present compound or the present composition and the liquid medium, an additional component other than them to the extent that the effects of the present invention are not impaired.

Examples of the other component include a known additive such as acid catalyst or basic catalyst that accelerates hydrolysis of the hydrolyzable silyl group and the condensation reaction.

The content of the other component in the present coating liquid is preferably 10% by mass or less, and more preferably 1% by mass or less.

The concentration of the present compound and the other component in total or the present composition and the other component in total in the present coating liquid (hereinafter, also referred to as the solid concentration) is preferably 0.001 to 40% by mass, preferably 0.01 to 20% by mass, more preferably 0.01 to 10% by mass, and more preferably 0.01 to 1% by mass. The solid concentration of the coating liquid is a value calculated from the mass of the coating liquid before heating and the mass after heating in a convection dryer at 120° C. for 4 hours.

[Article]

An article of the present invention (hereinafter, also referred to as "the present article") has a surface layer formed from the present compound or the present composition on the surface of a substrate. The surface layer may be formed on part of the surface of the substrate or on the entire surface of the substrate. The surface layer may be spread over the surface of the substrate in the form of a film or may be scattered in the form of dots.

The surface layer contains the present compound in a state where some or all of the hydrolyzable silyl groups of the present compound have undergone a hydrolysis reaction and the silanol groups have undergone a dehydration condensation reaction.

The thickness of the surface layer is preferably 1 to 100 nm, and particularly preferably 1 to 50 nm. When the thickness of the surface layer is 1 nm or more, it is easy to sufficiently obtain the effect of the surface treatment. When the thickness of the surface layer is 100 nm or less, the utilization efficiency is high. The thickness of the surface layer can be determined by obtaining the interference pattern of reflected X-rays by the X-ray reflectance method using an X-ray diffractometer for thin film analysis (manufactured by RIGAKU Corporation, ATX-G) and calculating from the oscillation period of the interference pattern.

Examples of the substrate include a substrate that is required to be provided with water and oil repellency. Examples thereof include a substrate that may be used in contact with an additional article (for example, a stylus) or human fingers, a substrate that may be held by human fingers during operation, and a substrate that may be placed on top of an additional article (for example, a mounting table).

Examples of the material of the substrate include metal, resin, glass, sapphire, ceramic, stone, and composite materials thereof. The glass may be chemically strengthened. On the surface of the substrate, a base film such as a $SiO_2$ film may be formed. More specifically, the substrates listed with respect to the aforementioned adhesion group T can be referred to.

As the substrate, a substrate for touch panels, a substrate for displays, and an eyeglass lens are suitable, and a substrate for touch panels is particularly suitable. As the material of the substrate for touch panels, glass or transparent resin is preferred.

Glass or resin film used for the exterior parts (excluding the display part) of devices such as cell phones (for example, smartphones), portable information terminals (for example, tablet terminals), game consoles, and remote controls is also preferred as the substrate.

[Method for Producing Article]

The present article can be produced by, for example, the following methods:

a method in which the surface of a substrate is treated by a dry coating method using the present compound or the present composition to form a surface layer formed from the present compound or the present composition on the surface of the substrate; and a method in which the present coating liquid is applied to the surface of a substrate by a wet coating method and dried to form a surface layer formed from the present compound or the present composition on the surface of the substrate.

Examples of the dry coating method include vacuum deposition, CVD, sputtering, and other techniques. As the dry coating method, the vacuum deposition method is preferred from the viewpoint of suppressing decomposition of the compound A1 or the compound A2 and from the viewpoint of simplicity of the equipment. During vacuum deposition, a pellet-like substance may be used that is obtained by impregnating a metal porous body such as iron or steel with the present compound or the present composition. A pellet-like substance impregnated with the compound A1 or compound A2 or the present composition may be used that is obtained by impregnating a metal porous body such as iron or steel with the present coating liquid and then drying the liquid medium.

Examples of the wet coating method include spin coating, wipe coating, spray coating, squeegee coating, dip coating, die coating, inkjet coating, flow coating, roll coating, casting, Langmuir-Blodgett coating, and gravure coating methods.

In order to improve the rub resistance of the surface layer, an operation may be carried out to accelerate the reaction between the present compound and the substrate, if necessary. Examples of such an operation include heating, humidification, and light irradiation.

For example, by heating a substrate having a surface layer formed thereon in an atmosphere with moisture, reactions can be accelerated, such as a hydrolysis reaction of hydrolyzable groups, a reaction between hydroxy and other groups on the surface of the substrate and silanol groups, and generation of siloxane bonds by a condensation reaction of silanol groups.

After the surface treatment, compounds in the surface layer that are not chemically bonded to other compounds or the substrate may be removed if necessary. Specific examples of the method therefor include a method in which a solvent is poured over the surface layer and a method in which the surface layer is wiped off with a cloth saturated with a solvent.

EXAMPLES

Hereinafter, the present invention will be described in further detail with reference to working examples, but the present invention is not limited to these working examples. In the following, "%" is "% by mass" unless otherwise noted. Note that Examples 1 to 4, 7 to 9, 11 to 14, and 17 to 19 are working examples, and Examples 5 to 6, 10, 15 to 16, and 20 are comparative examples.

Synthetic Example 1: Synthesis of Compound (1)

Diethyl diallylmalonate (60.0 g), lithium chloride (23.7 g), water (6.45 g), and dimethyl sulfoxide (263 g) were added and stirred at 160° C. After cooling to room temperature, water was added and extraction was performed with ethyl acetate. Hexane was added to the organic layer, which was washed with a saturated saline solution and dried over sodium sulfate. After filtration, the solvent was distilled off, thereby obtaining 39.5 g of compound (1) below.

(1)

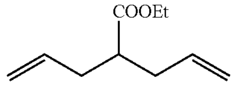

Synthetic Example 2: Synthesis of Compound (2)

THF (260 mL) and diisopropylamine (41.6 mL) were added, and the solution was then cooled to −78° C. A solution of n-butyl lithium in hexane (2.76 M, 96.6 mL) was added and the temperature was raised to 0° C. After stirring, the mixture was cooled to −78° C. to prepare a solution of lithium diisopropylamide (LDA) in THF. The above compound (1) (39.5 g) was added to the THF solution, and after stirring, allyl bromide (24.1 mL) was added. The temperature was raised to 0° C., 1 M hydrochloric acid was added, and THF was distilled off under reduced pressure. After extraction with dichloromethane, sodium sulfate was added. After filtration, the solvent was distilled off, and flash column chromatography using silica gel was carried out to obtain 45.0 g of compound (2).

(2)

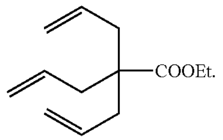

Synthetic Example 3: Synthesis of Compound (3)

The above compound (2) (45.0 g) was dissolved in THF and cooled to 0° C. A solution of lithium aluminum hydride in THF (104 mL, 260 mmol) was added and stirred. Water and a 15% aqueous sodium hydroxide solution were added, the mixture was stirred at room temperature, and then diluted with dichloromethane. After filtration, the solvent was distilled off, and flash column chromatography using silica gel was carried out to obtain 31.3 g of compound (3) below.

(3)

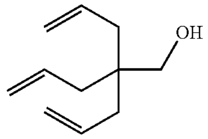

<Another Method for Synthesizing Compound (3)>

Synthetic Example 3-1: Synthesis of Compound (2a)

THF (260 mL) and diisopropylamine (41.6 mL, 294 mmol) were added, and the solution was then cooled to −78° C. A solution of n-butyl lithium in hexane (2.76 M, 96.6 mL, 267 mmol) was added and the temperature was raised to 0° C. to prepare a solution of lithium diisopropylamide (LDA) in THF.

THF (50 mL) was added to tert-butyl acetate (9.29 g), cooled to −78° C., and then the solution of LDA in THF (130 mL) was added. Allyl bromide (10.9 g) was added and the temperature was raised to 0° C. After 30 minutes, the mixture was cooled to −78° C., LDA (130 mL) and allyl bromide (10.9 g) were then added, and the temperature was raised to 0° C. After cooling again to −78° C., LDA (130 mL) and allyl bromide (10.9 g) were added and the temperature was raised to 0° C. After stirring for 30 minutes, 1 M hydrochloric acid (100 mL) was added and THF was distilled off under reduced pressure. After extraction with dichloromethane, sodium sulfate was added. After filtration, the solvent was distilled off, and flash column chromatography using silica gel was carried out to obtain 9.45 g of compound (2a) below.

(2a)

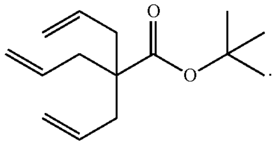

Synthetic Example 3-2: Synthesis of Compound (3)

The above compound (2a) (9.45 g) was dissolved in THF (100 mL) and cooled to 0° C. A solution of lithium aluminum hydride in THF (40 mL, 100 mmol) was added and stirred at 50° C. After adding 1 M hydrochloric acid (100 mL) at 0° C., extraction was performed with dichloromethane. The solvent was distilled off, and flash column chromatography using silica gel was carried out to obtain 5.99 g of the aforementioned compound (2-3).

(5)

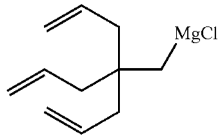

Synthetic Example 6: Synthesis of Compound (1-1)

According to the method described in Working Example 6 of International Patent Publication No. WO 2013/121984, compound (1-1) below was obtained.

$$CF_3—O—(CF_2CF_2O—CF_2CF_2CF_2CF_2O)_{x1}(CF_2CF_2O)—CF_2CF_2CF_2—C(O)OCH_3 \quad \text{formula (1-1)}$$

average value of unit number x1: 14

Synthetic Example 7: Synthesis of Compound (1-2)

After adding the aforementioned compound (1-1) (10.0 g) and 1,3-bistrifluoromethylbenzene (31 mL), a solution (11.0 mL) of the aforementioned compound (5) was added. After stirring at 60° C. for 20 hours, 1 M hydrochloric acid was added. After extraction with AE3000, drying was performed over sodium sulfate. After filtration, the solvent was distilled off, and flash column chromatography using silica gel was carried out to obtain 1.15 g of compound (1-2) below.

(1-2)

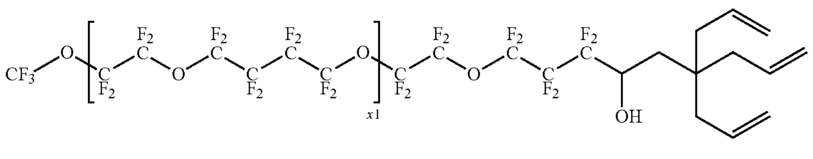

Synthetic Example 4: Synthesis of Compound (4)

Acetonitrile (380 mL), the aforementioned compound (3) (31.3 g), triphenylphosphine (64.3 g), and carbon tetrachloride (33.9 g) were added and stirred at 90° C. After concentration, ethyl acetate/hexane was added and stirred. After filtration and concentration, by distillation (70° C., 3 hPa), 28.2 g of compound (4) below was obtained.

(4)

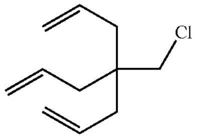

Synthetic Example 5: Synthesis of Compound (5)

THF (35 mL) and iodine (0.180 g) were added to magnesium (2.36 g) and the mixture was stirred at room temperature. A solution of the aforementioned compound (4) (14.0 g) in THF (35 mL) was added, and by heating reflux for 2 hours, a solution (0.80 M) of compound (5) below was prepared.

average value of unit number x1: 14

NMR Spectrum of Compound (1-2);

$^1$H-NMR (400 MHz, Chloroform-d) δ (ppm): 5.92-5.74 (m, 3H), 5.13-4.97 (m, 6H), 4.40 (s, 1H), 2.24-2.02 (m, 6H), 1.90 (d, J=7.7 Hz, 1H), 1.77 (d, J=15.2 Hz, 1H), 1.61 (dd, J=15.3, 10.1 Hz, 1H). $^{19}$F-NMR (376 MHz, Chloroform-d) δ (ppm): −55.24, −82.81, −87.63-−88.38 (m), −89.99-−90.36 (m), −117.61-−117.84 (m), −118.35-−118.58 (m), −123.13-−123.30 (m), −124.49-−124.66 (m), −125.24, −127.57-−127.77 (m).

Example 1: Synthesis of Fluorine-Containing Ether Compound (1-3)

AC2000 (1.8 g), the above compound (1-2) (0.300 g), a solution of platinum/1,3-divinyl-1,1,3,3-tetramethyldisiloxane complex in toluene (platinum content 3%, 12.9 mg), aniline (2.6 mg), and trimethoxysilane (45.5 mg) were added and stirred at 40° C. Then, the solvent was distilled off under reduced pressure to obtain 0.291 g of a fluorine-containing ether compound (1-3) below.

(1-3)

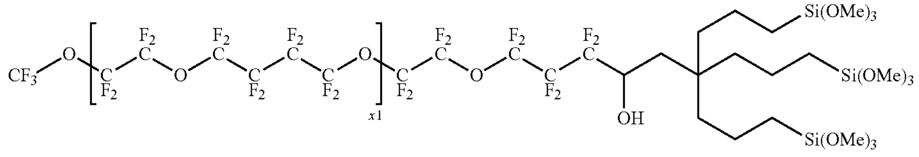

average value of unit number x1: 14

NMR Spectrum of Fluorine-Containing Ether Compound (1-3);

$^{1}$H-NMR (400 MHz, Chloroform-d) δ (ppm): 4.82-4.65 (m, 1H), 3.70-3.51 (m, 27H), 2.02-1.13 (m, 15H), 0.85-0.59 (m, 6H).

$^{19}$F-NMR (376 MHz, Chloroform-d) δ (ppm): −55.27, −82.85, −88.07, −90.19, −117.56, −122.25-−122.86 (m), −125.26.

Synthetic Example 8: Synthesis of Compound (2-1)

The aforementioned compound (1-2) (0.350 g) obtained in Synthetic Example 7, 1,3-bistrifluoromethylbenzene (3 mL), and the Dess-Martin reagent (0.350 g) were added and stirred at 35° C. for 2 hours. After adding methanol, extraction was performed with AC6000. The solvent was distilled off, and flash column chromatography using silica gel was carried out to obtain 0.280 g of compound (2-1) below.

(2-1)

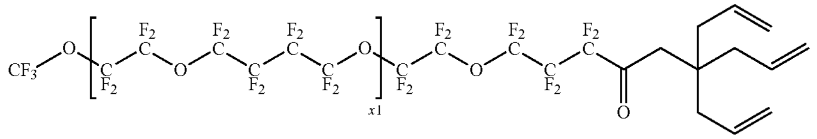

average value of unit number x1: 14

NMR Spectrum of Compound (2-1);

$^{1}$H-NMR (400 MHz, Chloroform-d) δ (ppm): 5.99-5.80 (m, 3H), 5.22-5.11 (m, 6H), 2.81 (s, 2H), 2.32 (d, J=7.6 Hz, 6H).

$^{19}$F-NMR (376 MHz, Chloroform-d) δ (ppm): −54.74, −81.50-−81.67 (m), −82.19, −87.15-−87.71 (m), −89.56, −118.50, −124.35, −124.59.

Example 2: Synthesis of Fluorine-Containing Ether Compound (2-2)

AC6000 (2.0 g), the above compound (2-1) (0.280 g), a solution of platinum/1,3-divinyl-1,1,3,3-tetramethyldisiloxane complex in toluene (platinum content 3%, 6.7 mg), aniline (2.0 mg), and trimethoxysilane (37.0 mg) were added and stirred at 40° C. Then, the solvent was distilled off under reduced pressure to obtain 0.286 g of a fluorine-containing ether compound (2-2) below.

(2-2)

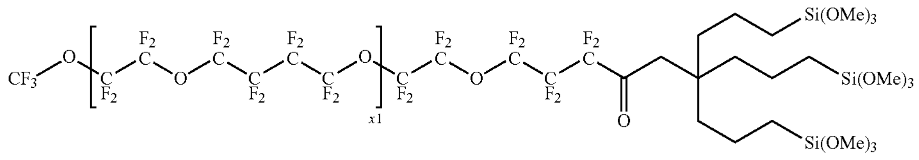

average value of unit number x1: 14

NMR Spectrum of Fluorine-Containing Ether Compound (2-2);

$^1$H-NMR (400 MHz, Chloroform-d) δ (ppm): 3.58 (s, 27H), 2.70 (s, 2H), 1.56-1.41 (m, 12H), 0.61 (t, J=7.5 Hz, 6H).

$^{19}$F-NMR (376 MHz, Chloroform-d) δ (ppm): −55.12, −81.96, −82.61, −87.51--87.97 (m), −89.98, −119.04, −124.72, −125.03.

Synthetic Example 9: Synthesis of Compound (3-1)

1,3-Bistrifluoromethylbenzene (7.5 mL), the aforementioned compound (1-2) (0.750 g) obtained in Synthetic Example 7, triphenylphosphine (0.406 g), and carbon tetrachloride (0.310 g) were added and stirred at 100° C. for 2 hours. After filtration, the solvent was distilled off, and flash column chromatography using silica gel was carried out to obtain 0.524 g of compound (3-1) below.

(3-1)

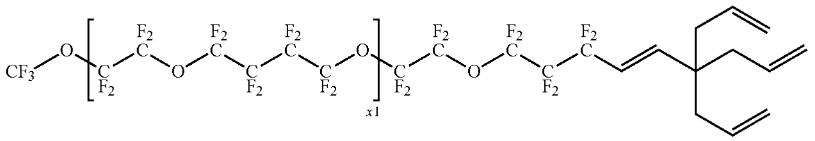

average value of unit number x1: 14

NMR Spectrum of Compound (3-1);

$^1$H-NMR (400 MHz, Chloroform-d) δ (ppm): 6.34 (dt, J=16.3, 2.1 Hz, 1H), 5.68 (ddt, J=17.7, 10.4, 7.4 Hz, 3H), 5.59-5.44 (m, 1H), 5.07-4.97 (m, 6H), 2.13 (d, J=7.3 Hz, 6H).

$^{19}$F-NMR (376 MHz, Chloroform-d) δ (ppm): −55.31, −81.79--82.03 (m), −82.92, −87.75--88.40 (m), −90.24 (q, J=8.2, 7.8 Hz), −110.96 (q, J=9.9 Hz), −125.35, −126.26.

Example 3: Synthesis of Fluorine-Containing Ether Compound (3-2)

AC2000 (3.1 g), the aforementioned compound (3-1) (0.524 g), a solution of platinum/1,3-divinyl-1,1,3,3-tetramethyldisiloxane complex in toluene (platinum content 3%, 17.3 mg), aniline (7.0 mg), and trimethoxysilane (69.1 mg) were added and stirred at 40° C. Then, the solvent was distilled off under reduced pressure to obtain 0.514 g of a fluorine-containing ether compound (3-2) below.

average value of unit number x1: 14

NMR Spectrum of Fluorine-Containing Ether Compound (3-2);

$^1$H-NMR (400 MHz, Chloroform-d) δ (ppm): 6.34 (dd, J=16.3, 2.0 Hz, 1H), 5.61 (dt, J=16.3, 11.7 Hz, 1H), 3.59 (s, 27H), 1.57-1.30 (m, 12H), 0.66 (t, J=7.5 Hz, 6H).

$^{19}$F-NMR (376 MHz, Chloroform-d) δ (ppm): −55.27, −81.64--81.91 (m), −82.85, −87.66--88.31 (m), −90.18 (q, J=8.7 Hz), −110.50 (q, J=10.2 Hz), −125.26, −125.96.

Synthetic Example 10: Synthesis of Compound (4-1)

After adding Fluorolink D4000 (manufactured by Solvay S.A., 15.0 g), 1,3-bis-trifluoromethylbenzene (50 ml), and acetonitrile (30 ml), a sodium hypochlorite solution (30 ml), TEMPO (1 g), and KBr (1 g) were added in the order presented. After stirring at 60° C. for 5 hours, diluted sulfuric acid was added. After extraction with AE3000, the solvent was distilled off, thereby obtaining 15.0 g of compound (4-1) below.

(4-1)

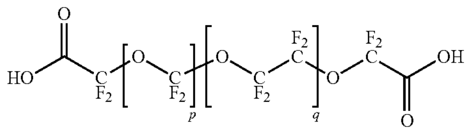

p: 22, q: 25

Synthetic Example 11: Synthesis of Compound (4-2)

After adding the aforementioned compound (4-1) (15.0 g), 1,3-bistrifluoromethylbenzene (50 mL), and methanol (50 ml), 1 g of concentrated sulfuric acid was added. After heating reflux, concentration was performed. By purifying the concentrate using flash column chromatography, 14.5 g of compound (4-2) below was obtained.

(3-2)

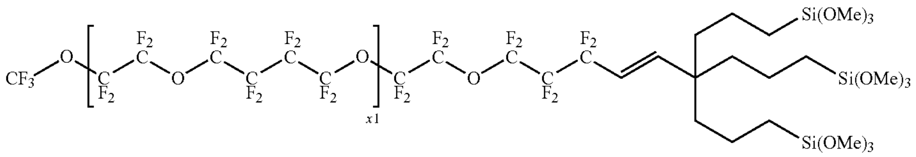

(4-2)

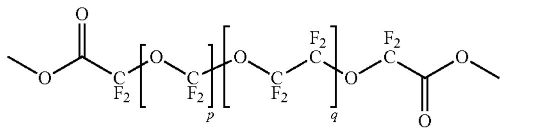

p: 22, q: 25

NMR Spectrum of Compound (4-2);

$^1$H-NMR (400 MHz, Chloroform-d) δ (ppm): 3.84 (s, 6H).

Synthetic Example 12: Synthesis of Compound (4-3)

After adding the aforementioned compound (4-2) (6.27 g) and 1,3-bistrifluoromethylbenzene (44 mL), a solution (11.0 mL) of the aforementioned compound (5) was added. After stirring at 60° C. for 1 hour, 1 M hydrochloric acid was added. After extraction with AE3000, drying was performed over sodium sulfate. After filtration, the solvent was distilled off, and flash column chromatography using silica gel was carried out to obtain 2.95 g of compound (4-3) below.

(4-3)

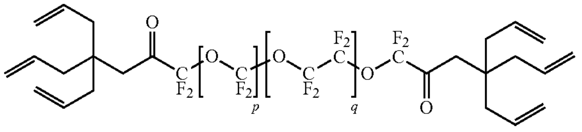

p: 22, q: 25

NMR Spectrum of Compound (4-3);

$^1$H-NMR (400 MHz, Chloroform-d) δ (ppm): 5.82-5.69 (m, 6H), 5.13-5.03 (m, 12H), 2.64 (s, 4H), 2.19 (d, J=7.6 Hz, 12H).

Synthetic Example 13: Synthesis of Compound (4-4)

The aforementioned compound (4-3) (2.95 g) was dissolved in AE3000 (20 mL) and cooled to 0° C. A solution of lithium aluminum hydride in THF (1.7 mL, 4.3 mmol) was added and stirred. After addition of 1 M hydrochloric acid and extraction with AE3000, the extract was dried over sodium sulfate. After filtration, the solvent was distilled off, and flash column chromatography using silica gel was carried out to obtain 0.216 g of compound (4-4) below.

(4-4)

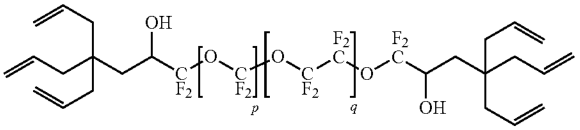

p: 22, q: 25

NMR Spectrum of Compound (4-4);

$^1$H-NMR (400 MHz, Chloroform-d) δ (ppm): 5.90-5.75 (m, 6H), 5.13-5.01 (m, 12H), 4.27-4.07 (m, 2H), 2.34-1.60 (m, 16H).

Example 4: Synthesis of Fluorine-Containing Ether Compound (4-5)

AC2000 (1.4 g), the aforementioned compound (4-4) (0.216 g), a solution of platinum/1,3-divinyl-1,1,3,3-tetramethyldisiloxane complex in toluene (platinum content 3%, 13.6 mg), aniline (12.4 mg), and trimethoxysilane (92.7 mg) were added and stirred at 40° C. Then, the solvent was distilled off under reduced pressure to obtain 0.211 g of a fluorine-containing ether compound (4-5) below.

(4-5)

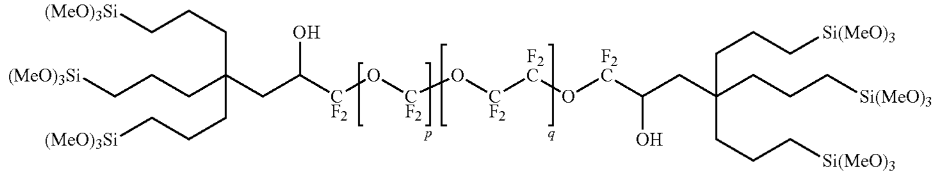

p: 22, q: 25

NMR Spectrum of Compound (4-4);

$^1$H-NMR (400 MHz, Chloroform-d) δ (ppm): 4.67-4.44 (m, 2H), 3.72-3.54 (m, 54H), 2.06-1.35 (m, 30H), 0.78-0.57 (m, 12H).

Synthetic Example 14: Another Synthetic Example of Aforementioned Compound (2-1)

After adding the aforementioned compound (1-1) (10.0 g) and 1,3-bistrifluoromethylbenzene (31 mL), a solution (11.0 mL) of the aforementioned compound (5) was added. After stirring at 60° C. for 3 hours, 1 M hydrochloric acid was added. After extraction with AE3000, drying was performed over sodium sulfate. After filtration, the solvent was distilled off, followed by washing with hexane, and flash column chromatography using silica gel was carried out to obtain 7.28 g of the aforementioned compound (2-1).

Synthetic Example 15: Another Synthetic Example of Aforementioned Compound (1-2)

The aforementioned compound (2-1) (7.15 g) was dissolved in AE3000 (36 mL) and cooled to 0° C. A solution of lithium aluminum hydride in THF (1.7 mL) was added and stirred. Water and a 15% aqueous sodium hydroxide solution were added, the mixture was stirred at room temperature. After extraction with AE3000, drying was performed over sodium sulfate. After filtration, the solvent was distilled off, and flash column chromatography using silica gel was carried out to obtain 5.27 g of the aforementioned compound (1-2).

Synthetic Example 16: Synthesis of Compound (5-1)

After adding the aforementioned compound (1-1) (10.0 g) and 1,3-bistrifluoromethylbenzene (31 mL), allylmagnesium bromide (10.0 mL, 0.7 M, 7.0 mmol) was added. After stirring at room temperature for 20 hours, 1 M hydrochloric acid was added. After extraction with AE3000, drying was performed over sodium sulfate. After filtration, the solvent was distilled off, and flash column chromatography using silica gel was carried out to obtain 5.57 g of compound (5-1) below.

(5-1)

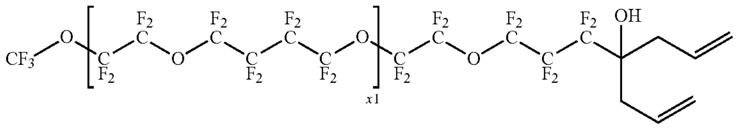

average value of unit number x1: 14

NMR Spectrum of Compound (5-1);

$^1$H-NMR (400 MHz, Chloroform-d) δ (ppm): 6.03-5.87 (m, 2H), 5.40-5.21 (m, 4H), 2.71-2.50 (m, 4H), 2.39 (s, 1H).

$^{19}$F-NMRf (376 MHz, Chloroform-d) δ (ppm): −54.87 (t, J=9.2 Hz), −82.17 (p, J=7.9 Hz), −86.90-−87.67 (m), −89.57 (q, J=9.1 Hz), −115.83-−116.17 (m), −121.47 (q, J=6.5 Hz), −124.52f.

Example 5: Synthesis of Compound (5-2)

AC2000 (1.8 g), the above compound (5-1) (0.320 g), a solution of platinum/1,3-divinyl-1,1,3,3-tetramethyldisiloxane complex in toluene (platinum content 3%, 13.5 mg), aniline (2.8 mg), and trimethoxysilane (45.5 mg) were added and stirred at 40° C. Then, the solvent was distilled off under reduced pressure to obtain 0.313 g of compound (5-2) below.

(5-2)

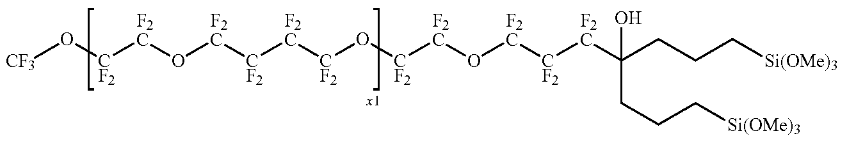

average value of unit number x1: 14

NMR Spectrum of Compound (5-2);

$^1$H-NMR (400 MHz, Chloroform-d) δ (ppm): 3.68-3.56 (m, 18H), 2.27-1.11 (m, 9H), 0.87-0.60 (m, 4H).

$^{19}$F-NMR (376 MHz, Chloroform-d) δ (ppm): −54.84 (t, J=9.1 Hz), −82.15 (dd, J=18.3, 9.3 Hz), −86.20, −87.09-−87.59 (m), −89.55 (q, J=9.4 Hz), −114.46-−116.39 (m), −120.82-−120.99 (m), −124.50.

Synthetic Example 17: Synthesis of Compound (6-1)

The above compound (5-1) (0.990 g), potassium hydroxide (0.079 g), tetrabutylammonium iodide (0.009 g), and allyl bromide (1.21 g) were added and then stirred at 80° C. for 20 hours. After addition of 1 M hydrochloric acid and extraction with AE3000, the extract was dried over sodium sulfate. After filtration, the solvent was distilled off, and flash column chromatography using silica gel was carried out to obtain 0.351 g of compound (6-1) below.

(6-1)

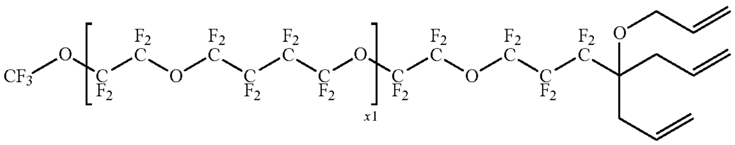

average value of unit number x1: 14

NMR Spectrum of Compound (6-1);

$^1$H-NMR (400 MHz, Chloroform-d) δ (ppm): 5.95-5.78 (m, 3H), 5.33-5.03 (m, 6H), 4.17 (d, J=5.0 Hz, 2H), 2.82-2.42 (m, 4H).

$^{19}$F-NMR (376 MHz, Chloroform-d) δ (ppm): −54.88 (t, J=9.2 Hz), −82.19, −87.00-−87.83 (m), −89.59 (q, J=9.5 Hz), −109.82-−111.37 (m), −121.70-−122.53 (m), −124.55.

Example 6: Synthesis of Compound (6-2)

AC2000 (1.8 g), the above compound (6-1) (0.351 g), a solution of platinum/1,3-divinyl-1,1,3,3-tetramethyldisiloxane complex in toluene (platinum content 3%, 14.5 mg), aniline (3.1 mg), and trimethoxysilane (45.5 mg) were added and stirred at 40° C. Then, the solvent was distilled off under reduced pressure to obtain 0.333 g of compound (6-2) below.

(6-2)

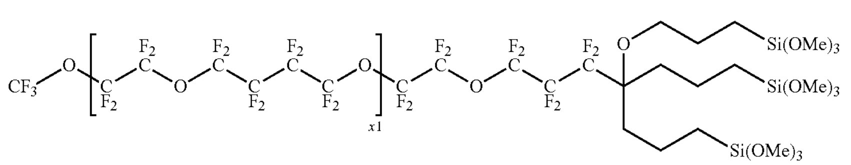

average value of unit number x1: 14

NMR Spectrum of Compound (6-2);

$^1$H-NMR (400 MHz, Chloroform-d) δ (ppm): 3.78-3.31 (m, 29H), 2.07-1.21 (m, 10H), 0.90-0.55 (m, 6H).

$^{19}$F-NMR (376 MHz, Chloroform-d) δ (ppm): −54.97 (t, J=9.1 Hz), −82.22, −87.14-−87.99 (m), −89.64 (q, J=9.5 Hz), −109.89-−111.67 (m), −121.87-−122.73 (m), −124.75.

Example 7: Preparation of Fluorine-Containing Ether Composition

The aforementioned compound (1-2) and the aforementioned compound (1-3) were mixed at a ratio of 80:20 (mass ratio) to obtain a fluorine-containing ether composition of Example 7.

Example 8: Preparation of Fluorine-Containing Ether Composition

The aforementioned compound (2-1) and the aforementioned compound (2-2) were mixed at a ratio of 75:25 (mass ratio) to obtain a fluorine-containing ether composition of Example 8.

Example 9: Preparation of Fluorine-Containing Ether Composition

The aforementioned compound (2-1) and the aforementioned compound (2-2) were mixed at a ratio of 85:15 (mass ratio) to obtain a fluorine-containing ether composition of Example 9.

Example 10: Preparation of Fluorine-Containing Ether Composition

The aforementioned compound (6-1) and the aforementioned compound (6-2) were mixed at a ratio of 80:20 (mass ratio) to obtain a fluorine-containing ether composition of Example 10.

Examples 11 to 16: Production and Evaluation of Articles

The respective compounds obtained in Examples 1 to 6 and the respective compositions obtained in Example 7 to Example 10 were used to treat the surface of a substrate, thereby obtaining articles of Examples 11 to 20. As the surface treatment method, each of the following dry coating method and wet coating method were used for each Example. Chemically strengthened glass was used as the substrate. The obtained articles were evaluated by the methods described below. The results are shown in Table 1 and Table 2.

(Dry Coating Method)

The dry coating was carried out using vacuum deposition equipment (manufactured by ULVAC, Inc., VTR350M) (vacuum deposition method). 0.5 g of each compound was filled into a molybdenum boat in the vacuum deposition equipment, and the inside of the vacuum deposition equipment was evacuated to $1\times10^{-3}$ Pa or less. The boat in which the compound was placed was heated at a temperature raising rate of 10° C./min or less, and the shutter was opened to start film formation on the surface of the substrate when the deposition rate exceeded 1 nm/sec as measured by a quartz crystal oscillation film thickness meter. When the film thickness reached about 50 nm, the shutter was closed to finish film formation on the surface of the substrate. The substrate on which the compound was deposited was subjected to a heating treatment at 200° C. for 30 minutes and washed with dichloropentafluoropropane (manufactured by AGC Inc., AK-225), thereby obtaining an article having a surface layer on the surface of the substrate.

(Wet Coating Method)

By mixing each compound and $C4F_9OC2H5$ (manufactured by 3M Company, Novec (register trade mark) 7200) as the medium, a coating liquid with a solid concentration of 0.05% was prepared. The substrate was dipped into the coating liquid, left for 30 minutes, and then taken out (dip coating method). The coating film was dried at 200° C. for 30 minutes and washed with AK-225, thereby obtaining an article having a surface layer on the surface of the substrate.

(Evaluation Methods)

<Measurement Method of Contact Angle>

The contact angle of about 2 μL of distilled water or n-hexadecane placed on the surface of the surface layer was measured using a contact angle measuring device (manufactured by Kyowa Interface Science, Inc., DM-500). Measurements were performed at five different locations on the surface of the surface layer, and their average value was calculated. The 20 method was used to calculate the contact angle.

<Initial Contact Angle>

The initial water contact angle and the initial n-hexadecane contact angle were measured for the surface layer by the aforementioned measurement method.

The evaluation criteria are as follows.

Initial Water Contact Angle:

A (Excellent): 115 degrees or more.

B (Good): 105 degrees or more and less than 115 degrees.

D (Poor): less than 105 degrees.

<Rub Resistance (Steel Wool)>

For the surface layer, steel wool bonster (#0000) was reciprocated 10,000 times at a pressure of 98.07 kPa and a speed of 320 cm/min using a reciprocating traverse tester (manufactured by KNT Co., Ltd.) in accordance with JIS L 0849:2013 (ISO 105-X12:2001), and the water contact angle was then measured by the aforementioned method. The smaller the decrease in water repellency (water contact angle) after rubbing, the smaller the decrease in performance due to rubbing and the more excellent the rub resistance. The evaluation criteria are as follows.

A (Excellent): The change in water contact angle after 10,000 reciprocations is 5 degrees or less.

B (Good): The change in water contact angle after 10,000 reciprocations is greater than 5 degrees and 8 degrees or less.

C (Fair): The change in water contact angle after 10,000 reciprocations is greater than 8 degrees and 10 degrees or less.

D (Poor): The change in water contact angle after 10,000 reciprocations is greater than 10 degrees.

<Light Resistance>

After irradiating the surface layer with light rays (650 W/$m^2$, 300 to 700 nm) for 500 hours at a black panel temperature of 63° C. using a desktop xenon arc lamp accelerated weatherometer (product name: SUNTEST XLS+, manufactured by Toyo Seiki Seisaku-sho, Ltd.), the water contact angle was measured by the aforementioned method. The evaluation criteria are as follows.

A (Excellent): The change in water contact angle after the accelerated weathering test is 5 degrees or less.

B (Good): The change in water contact angle after the accelerated weathering test is greater than 5 degrees and 10 degrees or less.

D (Poor): The change in water contact angle after the accelerated weathering test is greater than 10 degrees.

As shown in Table 1, even the articles of Example 15 and Example 16 using the compounds of Example 5 and Example 6 exhibited good initial contact angles and light resistance, but a decrease in water contact angle was confirmed, especially after the rubbing test. On the other hand, in the articles of Example 11 to Example 14 having surface layers using the fluorine-containing ether compounds of Example 1 to Example 4 having —CH(OH)—, —C(═O)—, or —CH═CH-between the polyfluoropolyether chain and the branched structure, a decrease in water contact angle after the rubbing test and the weathering test was suppressed, and they were shown to have excellent durability.

Also, as shown in Table 2, in the articles having surface layers using the fluorine-containing ether compositions of Examples 17 to 19 containing the fluorine-containing ether compounds of Example 1 to Example 4, a decrease in water contact angle after the rubbing test and the weathering test was suppressed, and they were shown to have excellent durability. Furthermore, according to the comparison between Example 11 and Example 17, it was shown that the use of the fluorine-containing ether compound (1-3) having hydrolyzable silyl groups in combination with the fluorine-containing ether compound (1-2) having unsaturated hydrocarbon groups further improves the rub resistance.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fluorine-containing ether compound represented by formula (A1) or formula (A2) below:

$$R^fO—(R^{f1}O))_m—R^1\text{-}L^1\text{-}R^2\text{-}Q^1(\text{-}T)_n \quad \text{formula (A1)}$$

$$(T\text{-})_nQ^1\text{-}R^2\text{-}L^1\text{-}R^1—O—(R^{f1}O)_m—R^1\text{-}L^1\text{-}R^2\text{-}Q^1(\text{-}T)_n \quad \text{formula (A2)}$$

TABLE 1

| | | Example | | | | | |
|---|---|---|---|---|---|---|---|
| | | 11 | 12 | 13 | 14 | 15 | 16 |
| Compound | Type | Compound (1-3) | Compound (2-2) | Compound (3-2) | Compound (4-5) | Compound (5-2) | Compound (6-2) |
| Dry coating | Initial contact Water angle | A | A | A | B | A | A |
| | Rub resistance | B | A | A | B | D | C |
| | Light resistance | A | B | A | B | B | B |

TABLE 2

| Example | | 17 | 18 | 19 | 20 |
|---|---|---|---|---|---|
| Composition | Type | Compounds (1-2) + (1-3) | Compounds (2-1) + (2-2) | Compounds (3-1) + (3-2) | Compounds (6-1) + (6-2) |
| Dry coating | Initial contact Water angle | A | A | A | A |
| | Rub resistance | A | A | A | C |
| | Light resistance | A | B | A | B |

wherein $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^1$ is a (1+n)-valent linking group, and a plurality of $Q^1$, when present, may be the same as or different from each other;

T is an adhesion group, and a plurality of T may be the same as or different from each other;

m is an integer of 0 to 210; and n is an integer of 2 to 20, and a plurality of n, when present, may be the same as or different from each other.

2. The fluorine-containing ether compound according to claim 1, wherein $R^1$ has 1 to 6 carbon atoms.

3. The fluorine-containing ether compound according to claim 1, wherein $R^2$ has 1 to 10 carbon atoms.

4. The fluorine-containing ether compound according to claim 1, wherein $-Q^1\ (-T)_n$ is $-Q^2[(-R^3-T)_a(-R^4)_{3-a}]$, wherein $Q^2$ is a carbon atom or a silicon atom, and a plurality of $Q^2$, when present, may be the same as or different from each other;

$R^3$ is a single bond or an alkylene group optionally having a fluorine atom and optionally having an ether bond between carbon atoms, and a plurality of $R^3$, when present, may be the same as or different from each other;

$R^4$ is a hydrogen atom, a fluorine atom, an alkyl group optionally having a fluorine atom and optionally having an ether bond between carbon atoms, or $—R^5-Q^2[(-R^3-T)_b(-R^6)_{3-b}]$, and a plurality of $R^4$, when present, may be the same as or different from each other;

$R^5$ is a single bond or an alkylene group optionally having a fluorine atom and optionally having an ether bond between carbon atoms, and a plurality of $R^5$, when present, may be the same as or different from each other;

$R^6$ is a hydrogen atom, a fluorine atom, an alkyl group optionally having a fluorine atom and optionally having an ether bond between carbon atoms, or $—R^5-Q^2[(-R^3-T)_c(—R^7)_{3-c}]$, and a plurality of $R^6$, when present, may be the same as or different from each other;

$R^7$ is a hydrogen atom, a fluorine atom, or an alkyl group optionally having a fluorine atom and optionally having an ether bond between carbon atoms, and a plurality of $R^7$, when present, may be the same as or different from each other;

a is an integer of 0 to 3;

b is an integer of 0 to 3, and a plurality of b, when present, may be the same as or different from each other;

c is an integer of 0 to 3, and a plurality of c, when present, may be the same as or different from each other; and a sum of a, b, and c is n.

5. The fluorine-containing ether compound according to claim 4, wherein $R^3$ has 2 to 7 carbon atoms.

6. The fluorine-containing ether compound according to to claim 1, wherein T is one or more selected from a bromine atom, an iodine atom, a hydroxy group, an amino group, a carboxy group, an aldehyde group, an epoxy group, a thiol group, a phosphate group, a phosphonate group, an unsaturated hydrocarbon group, an aryl group, and $—Si\ (R^{21})_{3-d}(L^{21})_d$, wherein $R^{21}$ is an alkyl group;

$L^{21}$ is a hydrolyzable group or a hydroxy group, and a plurality of $L^{21}$ may be the same as or different from each other; and d is 2 or 3.

7. A compound represented by formula (B1) or formula (B2) below:

$$R^fO—(R^{f1}O)_m—R^1-L^1-R^2-Q^{11}(-CH—CH_2) \quad \text{formula (B1)}$$

$$(CH_2═CH—)Q^{11}-R^2-L^1-R^1—O—(R^fO)_m—R^1-L^1-R^2-Q^1(-CH═CH_2)_n \quad \text{formula (B2)}$$

wherein $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^{11}$ is a (1+n)-valent linking group, and a plurality of $Q^{11}$, when present, may be the same as or different from each other;

m is an integer of 0 to 210; and n is an integer of 2 to 20, and a plurality of n, when present, may be the same as or different from each other.

8. The compound according to claim 7, wherein $-Q^{11}(-CH═CH_2)_n$ is $-Q^2[(-R^{23}—CH═CH_2)_a(—R^{24})_{3-a}]$, wherein $Q^2$ is a carbon atom or a silicon atom, and a plurality of $Q^2$, when present, may be the same as or different from each other;

$R^{23}$ is a single bond or an alkylene group optionally having a fluorine atom and optionally having an ether bond between carbon atoms, and a plurality of $R^{23}$, when present, may be the same as or different from each other;

$R^{24}$ is a hydrogen atom, a fluorine atom, an alkyl group optionally having a fluorine atom and optionally having an ether bond between carbon atoms, or $—R^{25}-Q^2[(-R^{23}—CH—CH_2)_b(—R^{26})_{3-b}]$, and a plurality of $R^{24}$, when present, may be the same as or different from each other;

$R^{25}$ is a single bond or an alkylene group optionally having a fluorine atom and optionally having an ether bond between carbon atoms, and a plurality of $R^{25}$, when present, may be the same as or different from each other;

$R^{26}$ is a hydrogen atom, a fluorine atom, an alkyl group optionally having a fluorine atom and optionally having an ether bond between carbon atoms, or $—R^{25}-Q^2[($-

$R^{23}$—CH═CH$_2$)$_c$(—$R^{27}$)$_{3-c}$], and a plurality of $R^{26}$, when present, may be the same as or different from each other;

$R^{27}$ is a hydrogen atom, a fluorine atom, or an alkyl group optionally having a fluorine atom and optionally having an ether bond between carbon atoms, and a plurality of $R^{27}$, when present, may be the same as or different from each other;

a is an integer of 0 to 3;

b is an integer of 0 to 3, and a plurality of b, when present, may be the same as or different from each other;

c is an integer of 0 to 3, and a plurality of c, when present, may be the same as or different from each other; and a sum of a, b, and c is n.

9. A method for producing a compound represented by formula (B11) or formula (B12) below, the method comprising reacting a compound represented by formula (C1) or formula (C2) below with a compound represented by formula (D1) below:

$R^fO$—$(R^{f1}O)_m$—$R^1$—C(═O)—$OR^{11}$ formula (C1)

$R^{11}O$—C(═O)—$R^1$—O—$(R^{f1}O)_m$—$R^1$—C(═O)—$OR^{11}$ formula (C2)

$(CH_2$—CH—$)_nQ^{11}$-$R^2$—MgX formula (D1)

$R^fO$—$(R^{f1}O))_m$—$R^1$-$L^{11}$-$R^2$-$Q^{11}$(—CH═CH$_2$)$_n$ formula(B11)

$(CH_2$═CH—$)_nQ^{11}$-$R^2$-$L^{11}$-$R^1$—O—$(R^{f1}O)_m$—$R^1$-$L^1$-$R^2$-$Q^{11}$(—CH═CH)$_n$ formula (B12)

wherein $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$R^{11}$ is an alkyl group, and a plurality of $R^{11}$, when present, may be the same as or different from each other;

$L^{11}$ is —CH(OH)—, —C(═O)—, —CH═CH—, or —$CH_2$—, and a plurality of $L^{11}$, when present, may be the same as or different from each other;

$Q^{11}$ is a (1+n)-valent linking group, and a plurality of $Q^{11}$, when present, may be the same as or different from each other;

X is a halogen atom;

m is an integer of 0 to 210; and n is an integer of 2 to 20, and a plurality of n, when present, may be the same as or different from each other.

10. A method for producing a fluorine-containing ether compound represented by formula (A11) or formula (A12) below, the method comprising introducing an adhesion group T into a compound represented by formula (B11) or formula (B12) below:

$R^fO$—$(R^{f1}O)_m$—$R^1$-$L^{11}$-$R^2$-$Q^{11}$(—CH═CH$_2$)$_n$ formula (B11)

$(CH_2$═CH—$)_nQ^{11}$-$R^2$-$L^1$-$R^1$—O—$(R^fO)_m$—$R^1$-$L^{11}$-$R^2$-$Q^1$(—CH═CH$_2$) formula(B12)

$R^fO$—$(R^fO)_m$—$R^1$-$L^{11}$-$R^2$-$Q^1$(-T)$_n$ formula(A11)

(T-)$_nQ^1$-$R^2$-$L^1$-$R^1$—O—$(R^fO)_m$—$R^1$-$L^{11}$-$R^2$-$Q^1$(-T)$_n$ formula (A12)

wherein $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^{11}$ is —CH(OH)—, —C(═O)—, —CH═CH—, or —$CH_2$—, and a plurality of $L^{11}$, when present, may be the same as or different from each other;

$Q^1$ is a (1+n)-valent linking group, and a plurality of $Q^1$, when present, may be the same as or different from each other;

$Q^{11}$ is a (1+n)-valent linking group, and a plurality of $Q^{11}$, when present, may be the same as or different from each other;

m is an integer of 0 to 210;

n is an integer of 2 to 20, and a plurality of n, when present, may be the same as or different from each other; and T is an adhesion group and a plurality of T may be the same as or different from each other.

11. A fluorine-containing ether composition comprising a fluorine-containing ether compound represented by formula (A1) below and a fluorine-containing ether compound represented by formula (A2) below:

$R^fO$—$(R^{f1}O)_m$—$R^1$-$L^1$-$R^2$-$Q^1$(-T)$_n$ formula (A1)

(T-)$_nQ^1$-$R^2$-$L^1$-$R^1$—O—$(R^{f1}O))_m$—$R^1$-$L^1$-$R^2$-$Q^1$(-T)$_n$ formula (A2)

wherein $R^f$ is a fluoroalkyl group having 1 to 20 carbon atoms;

$R^{f1}$ is a fluoroalkylene group having 1 to 6 carbon atoms, and a plurality of $R^{f1}$, when present, may be the same as or different from each other;

$R^1$ is an alkylene group optionally having a fluorine atom, and a plurality of $R^1$, when present, may be the same as or different from each other;

$R^2$ is a single bond or an alkylene group optionally having a fluorine atom, and a plurality of $R^2$, when present, may be the same as or different from each other;

$L^1$ is —CH(OH)—, —C(═O)—, or —CH═CH—, and a plurality of $L^1$, when present, may be the same as or different from each other;

$Q^1$ is a (1+n)-valent linking group, and a plurality of $Q^1$, when present, may be the same as or different from each other;

T is an adhesion group, and a plurality of T may be the same as or different from each other;

m is an integer of 0 to 210; and n is an integer of 2 to 20, and a plurality of n, when present, may be the same as or different from each other.

12. A fluorine-containing ether composition comprising one or more of the fluorine-containing ether compound according to claim 1 and an additional fluorine-containing ether compound.

13. A coating liquid comprising:

the fluorine-containing ether compound according to claim 1 and a liquid medium.

14. A coating liquid comprising:

the fluorine-containing ether composition according to claim 11 and a liquid medium.

15. An article comprising a surface layer formed from the fluorine-containing ether compound according to claim 1 on a surface of a substrate.

16. An article comprising a surface layer formed from the fluorine-containing ether composition according to claim 11 on a surface of a substrate.

17. A method for producing an article, comprising forming a surface layer by a dry coating method or a wet coating method using the fluorine-containing ether compound according to claim 1.

18. A method for producing an article, comprising forming a surface layer by a dry coating method or a wet coating method using the fluorine-containing ether composition according to claim 11.

19. A method for producing an article, comprising forming a surface layer by a dry coating method or a wet coating method using the coating liquid according to claim 13.

* * * * *